(12) United States Patent
Rowell et al.

(10) Patent No.: US 11,257,272 B2
(45) Date of Patent: Feb. 22, 2022

(54) GENERATING SYNTHETIC IMAGE DATA FOR MACHINE LEARNING

(71) Applicant: Lucid VR, Inc., Santa Clara, CA (US)

(72) Inventors: Adam Rowell, Mountain View, CA (US); Sheldon Fernandes, San Jose, CA (US); Han Jin, Milpitas, CA (US)

( * ) Notice: Subject to any disclaimer, the term of this patent is extended or adjusted under 35 U.S.C. 154(b) by 0 days.

(21) Appl. No.: 16/395,077

(22) Filed: Apr. 25, 2019

(65) Prior Publication Data

US 2020/0342652 A1  Oct. 29, 2020

(51) Int. Cl.
| | |
|---|---|
| *G06T 15/00* | (2011.01) |
| *G06T 17/20* | (2006.01) |
| *G06T 7/73* | (2017.01) |
| *G06T 7/80* | (2017.01) |
| *G06K 9/62* | (2022.01) |
| *G06T 7/50* | (2017.01) |
| *G06T 1/00* | (2006.01) |

(52) U.S. Cl.
CPC .......... *G06T 15/005* (2013.01); *G06K 9/6256* (2013.01); *G06T 1/0014* (2013.01); *G06T 7/50* (2017.01); *G06T 7/75* (2017.01); *G06T 7/85* (2017.01); *G06T 17/20* (2013.01)

(58) Field of Classification Search
CPC ......... G06T 19/00; G06T 17/20; G06T 17/00; G06T 15/10; G06T 15/00
USPC ....................................................... 345/419
See application file for complete search history.

(56) References Cited

U.S. PATENT DOCUMENTS

2019/0057519 A1*  2/2019  Cinnamon .............. G06T 17/30
2019/0199993 A1*  6/2019  Babu J D ............ H04N 13/128

\* cited by examiner

*Primary Examiner* — Gordon G Liu

(57) ABSTRACT

Described are systems and methods for generating synthetic image data including synthetic images, depth information, and optical flow data. Embodiments of the invention assemble image scenes from virtual objects and capture realistic perspectives of images scenes as synthetic images. Realistic perspectives captured in synthetic images are defined by camera views created from camera settings files. To simulate capture performance of smartphone cameras, stereo cameras, and other actual camera devices, capture, calibration, and camera intrinsic parameters included in camera settings files are identical to parameters included in actual cameras. Synthetic image datasets generated by the systems and methods described herein are used to train machine learning systems generating machine learning models for performing computer vision tasks.

18 Claims, 11 Drawing Sheets

GENERATING SYNTHETIC IMAGE DATA FOR MACHINE LEARNING

CROSS REFERENCE TO RELATED APPLICATIONS

This application relates to patent application Ser. No. 16/254,542 entitled "REAL TIME RE-CALIBRATION OF STEREO CAMERAS" filed Jan. 22, 2019 and U.S. patent application Ser. No. 16/166,018 entitled "3D CAMERA CALIBRATION FOR ADJUSTABLE CAMERA SETTINGS" filed Oct. 19, 2018; both of which are incorporated by reference herein in their entirety.

BACKGROUND

Computer vision (CV) is a technical discipline that allows computers, electronic machines, and connected devices to gain high-level understanding from digital images or videos. Typical CV tasks include scene reconstruction, event detection, video tracking, object recognition, 3D pose estimation, boundary identification, motion estimation, object tracking, facial recognition, object counting, 3D imaging, image enhancement and image restoration. Nearly all CV tasks involve processing pixel data (e.g., RGB and grayscale image data) along with additional channels of image data including depth, image segmentation, image noise, boundaries between captured objects, captured object speed, and captured object direction. To provide additional image data channels, many CV applications leverage sensor data collected by multi-sensor devices including optical sensors, motion sensors, depth sensors, touch sensors, acoustic sensors, location sensors, etc. In contrast, stereo camera systems generate additional channels of image data by synthesizing the disparity between pixels included in captured right and left stereo images. Stereo camera systems thereby provide sufficient sensor data for performing CV tasks without the expense of complex sensor hardware.

Traditionally, CV tasks are performed using computationally expensive algorithms (e.g., stereo matching algorithms for determining disparity between two stereo images). Continued adherence to Moore's law, the advent of cloud computing, and the growing importance of sensor systems have made traditional CV algorithms more prevalent than ever before. Every year a tremendous amount of research is done to improve and refine existing classical CV approaches as well as invent new algorithms for CV. Despite rapid improvement in the accuracy of algorithmic approaches to CV, the computational and energy expense of executing classical CV algorithms make mobile implementations impractical.

To meet rising demand for more capable mobile computing devices, new paradigms of CV techniques have emerged. Machine learning methods of CV are the most developed and widely adopted new approach. The profuse proliferation of data including images on the internet over the last five to ten years, has allowed data intensive techniques including machine learning to flourish. Recently, both rules based (e.g., decision trees, random forest, and Bayesian models) and learning based (e.g., neural networks and deep learning models) machine learning techniques have been applied to CV problems with significant success. By isolating computationally and energy expensive processing to a training stage (usually performed by virtual machines in the cloud), machine learning approaches remove barriers to performing CV tasks on mobile devices. Once trained, complex and highly accurate machine learning models are downloaded to mobile device memory and quickly inferenced by mobile processors to perform CV tasks (e.g., facial recognition, depth sensing, image reconstruction, image augmentation or enhancement, object tracking, image segmentation, etc.).

Training neural networks to generate accurate machine learning models for CV applications requires vast amounts of image data. Neural networks capable of rivaling the accuracy of traditional CV methods must ingest a wide variety of specialized image data. For example, to generate a model identifying images including chairs a neural network is trained on many images including images having chairs of various shapes and types, images without chairs, and many edge case images including objects that resemble chairs but are not chairs. Model accuracy and training time required by each neural network depends heavily on the composition of the training data. Therefore, selecting the right data to incorporate into a training data set is critical in most machine learning techniques.

Despite the amount of photographs available online, image data for training CV networks is scarce. For a license fee, large amounts of 2D RGB images are available, however, without additional image data channels or stereo image pairs, the range of problems networks can be trained to solve is limited (e.g., simple image classification or object identification). To perform more complex CV tasks (e.g., facial recognition, object tracking, image segmentation, image reconstruction, etc.), more advanced training data is required. Although a few open source databases of stereo images exist (e.g., Middlebury, KITTI, and MPI Sintel), these databases include one thousand or less images and each capture a limited type of subject matter (e.g., street views of suburban scenes). Therefore, most datasets for training stereo CV models are captured using expensive and time consuming manual processes. Depending on the lighting conditions, camera device used, skill of the photographer, and subject of the photograph, manually captured images may also be low quality due to occlusion zones, noise, and other defects.

Thus, there is a need in the field of CV to create training data sets comprising synthetic images generated using automated processes. The embodiments of the present invention provide methods for generating synthetic image data including RGB image pixel data and additional image data channels (e.g., ground truth disparity data, depth information, image noise data, image segmentation information, and object tracking information). Empirical evidence suggests synthetic image data is just as effective as manually captured images for training neural networks and other machine learning systems. Therefore, synthetic image data generated using the methods described herein is useful as training data for machine learning systems.

DETAILED DESCRIPTION

Figure 1:
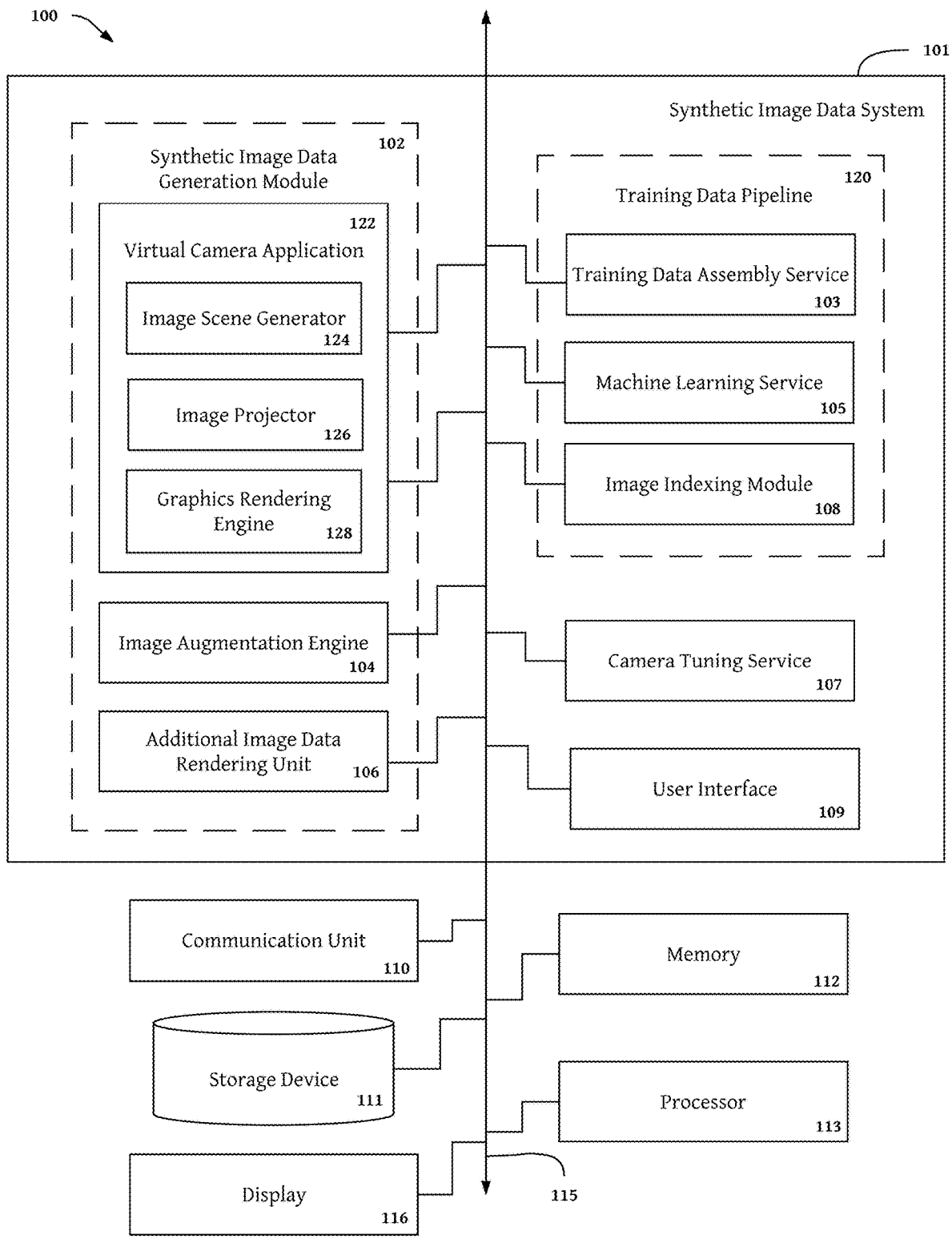
FIG. 1 is a block diagram showing components a synthetic image generation module that generates synthetic images and image data channels.

The present invention comprises systems and methods for generating synthetic image data including RGB images and additional image data channels. The synthetic image generation system described herein may generate single images or stereo image pairs using a variety of processing methods. In some embodiments, synthetic images are generated by assembling 2D backgrounds, objects, and textures into an image scene and orienting one or more virtual cameras within the scene according to one or more camera setting files. In other examples, synthetic images are produced by orienting one or more virtual cameras within a 3D scene according to one or more camera setting files. Camera setting files include camera position data and other parameters defining the image plane captured in the synthetic image. Synthetic images and additional image data channels generated using the methods described herein are useful for training neural networks to perform CV tasks including facial recognition, depth sensing, image reconstruction, image augmentation or enhancement, object tracking, image segmentation, etc. Generated synthetic images and image data channels are also useful for improving the functionality of camera devices, for example, by providing data for intelligent auto focus, performance feedback for camera tuning, and error adjustment simulations for auto calibration.

Systems and methods of generating synthetic data described herein improve machine learning in the field of CV by removing barriers to obtaining image data for training neural networks and other machine learning systems. In particular, resource and time intensive manual image capture tasks including scene construction, camera operation for image capture, and post processing steps generating additional image channels are accelerated by the systems and methods of the present invention. Executing one or more routines to virtually perform scene creation, scene capture, and generation of additional image data channels allows the synthetic image generation system to produce vast quantities of image data at a fraction of the time and cost of conventional methods.

Images created by the system described herein also include new varieties of synthetic images captured using camera settings accurately modeling the actual camera devices. In some embodiments, realistic, camera device specific synthetic images are provided by synthetic image generating systems and methods described herein. To produce device specific synthetic images, parameters included in camera setting file (e.g., camera intrinsic, camera extrinsics, and camera calibration metadata) may define an image plane identical to the image plane of a known mono camera or stereo camera device. Additional camera setting file parameters including camera calibration metadata, camera capture settings, image augmentation settings, and camera intrinsics may also be set to values that mirror the parameters of actual camera devices. The range of adjustment of these parameters may also be set identical to the parameter ranges of actual camera devices. By generating synthetic images using camera setting files having camera specifications, features, and camera calibration metadata identical to existing camera devices, the systems and methods described herein provide synthetic images simulating the actual use and performance of exiting camera devices. Introducing lens distortion, blur, noise, glare, and other defects into the synthetic images simulates capture errors occurring during actual use. The systems and methods described herein use the synthetic image data to improve the performance of existing camera devices by testing different camera settings under the same capture conditions to discover and implement adjustments required to alleviate capture errors.

Conventional methods of aggregating image datasets rely on manual steps performed by a photographer. To capture images of a particular subject or scene, a photographer must travel to a location were the scene exists or design a set having the desired characteristics. Conventional scene construction is highly qualitative and imprecise absent a detailed blueprint illustrating the specific objects, scene dimensions, arrangements of foreground and background elements, object depths, and other scene characteristics. Once on site, photographers wait for the ideal lighting, weather, and other capture conditions to occur. Similarly, for designed sets, additional lighting equipment must be installed on set before capture. By providing routines for selecting scene elements from a library of background images, foreground objects, and texture, the systems and methods of generating synthetic image data described herein remove the time and location constraints of manual scene construction. The systems and methods of the invention also enable more precise scene construction wherein exact values for scene dimensions, object sizes, object depths, and other scene characteristics are known and customizable throughout scene construction.

The systems and methods of generating synthetic image data also reduce the time, expense, and difficulty of scene capture. Routines for incrementally varying camera orientation (e.g., position, objection depth, field of view, etc.) and camera capture settings (e.g., zoom, focus, baseline, etc.) may be implemented by systems and methods of the present invention to create hundreds or thousands of images depicting unique perspectives of a scene in minutes or seconds. Camera orientation and camera capture settings are also precisely defined in camera settings files to provide specific camera location and capture setting values for each synthetic image. Systems and methods described herein may vary the camera location and camera capture settings in real time to generate a customized library of synthetic images having one or more scene views or perspectives required for a particular application. Conventional methods of capturing different scene views are imprecise, qualitative, time consuming, and expensive. Even for highly skilled photographers with an unlimited budget, obtaining a complex set of precise scene views (e.g., a comprehensive set of incrementally spaced perspectives captured from a consistent depth) may be impossible. Manual generation of simpler scene perspective compilations takes hours and does not provide precise values for camera location. If known by the photographer, camera capture settings used to generate each perspective must either be manually associated with each image or extracted from the image metadata during post processing.

Synthetic image data produced by the systems and methods of the present invention is rapidly iterative and can be edited, changed, and/or updated within seconds or minutes. For example, synthetic image sets for facial recognition tasks may be customized to include only faces set at various distances away from a capturing virtual camera. When producing image data used to train machine learning systems, the specifications and perspectives included in synthetic images generated by the systems and methods described herein may be updated in real time based on the training results. In one embodiment, the system for generating synthetic image data produces a face image dataset including thousands of images of faces for training facial recognition machine learning systems (e.g., a neural network). Different iterations of the synthetic face image dataset may be developed by the synthetic image generation system in advance of training. Then, if a particular iteration of the synthetic face image dataset provides more accurate models, the synthetic image generation system may be modified during training to produce synthetic images having the characteristics of the optimal iteration of the synthetic face image dataset.

In some embodiments, models produced by a network trained on face images of subjects captured from the shoulders up 1-2 m away from a virtual camera are more accurate than models produced by a network trained on face images with other specifications (e.g., face images of subjects less captured from the neck up, face images of subjects less than 1 m away from a virtual camera, etc.). To maximize accuracy of the facial recognition model, the synthetic image generation system may be modified to produce a library of synthetic images having similar characteristics to the images providing the best results during training. By rapidly generating a large library of images having characteristics of the most effective training images, the synthetic image generation system avoids overfitting problems observed in many machine learning systems trained on a limited amount of images. Therefore, the systems and methods of generating synthetic data described herein enhance the accuracy and extensibility of machine learning models trained on image data by providing scalable application specific training datasets having a sufficient images to avoid overfitting.

Systems and methods of generating synthetic image data also ensure the same image is not present more than once in a training set. Conventional methods of assembling image datasets including photographing live scenes, licensing image libraries, and scraping or aggregating images from the Internet do not provide precise control of images included in datasets. Therefore, duplicate images may be included and/or datasets may be saturated with many highly similar images. The system for synthetic image generation described herein includes an image augmentation engine that introduces variation into synthetic images. The augmentation engine modifies synthetic images by adding noise, blur, special transformations, chromatic transformations, and other defects and/or augmentations to ensure synthetic image datasets are highly variable.

The synthetic image generation system also includes a synthetic image indexing module that provides image metadata for each synthetic image. The image metadata comprises synthetic image characteristics including scene composition (i.e., background, foreground objects, object arrangement, textures, etc.), camera settings (e.g., camera intrinsics, camera extrinsics, camera calibration metadata, etc.), camera capture settings (e.g., zoom, focus, baseline, zero disparity plane depth, lighting conditions, etc.), and image augmentations. By referencing image metadata during the dataset generation, the synthetic image generation system avoids producing duplicate images and provides precise control of synthetic image characteristics.

Scenes generated by the synthetic image system described herein use encoded depth information to render scenes in 3D. Therefore, synthetic images capturing a particular scene projection include fully annotated ground truth depth information that is fully contiguous, dense, and accurate. Conventional methods of generating ground truth depth information include using a dedicated depth sensor (e.g., a time of flight sensor, dot field projection, LIDAR system, etc.). Additional sensor hardware is expensive and frequently these systems cannot generate depth information having ground truth level accuracy without extensive calibration and testing. Depth information may also be generated from disparity data obtained through stereo image synthesis. Depth information generated from stereo images, however, is generally not fully contiguous because any occlusion or defect in one of the images produces disparity occlusion at that location. Therefore, perfect stereo images are required to produce ground truth quality depth information from stereo images and this level of image quality is impossible without expensive camera hardware and ideal capture conditions. By using encoded depth information to generate ground truth quality depth information for all synthetic images, the synthetic image generation system provides significant time, cost, and accuracy advantages over conventional methods of generating ground truth data.

The synthetic image generation system also improves conventional systems of aggregating image information by providing fully annotated ground truth depth information in addition to pixel image data. Using encoded depth information, the synthetic image generation system may also generate additional channels of image data including image segmentation data and optical flow data. In some embodiments, image segmentation data may group and/or separate objects based on the distance away from a virtual capturing camera. Using image segmentation data the synthetic image generation system may identify occluded areas present in a scene perspective and provide additional information object the depth layers effected by lens effects and other image augmentations (e.g., glare, blur, noise, etc.) Optical flow data may include velocity channels indicating the speed of object motion from one image frame to the next and direction channels indicating the direction of object motion. Channels of optical flow data may be used for training one or more object tracking machine learning systems. Using conventional image aggregation techniques, it is impossible to generate the additional image channels provided by the synthetic image generation system (e.g., ground truth depth information, image segmentation data, and optical flow data) without costly, computationally involved, and energy intensive post capture processing steps. The combination of image pixel data and one or more additional image data channels provided by the synthetic image generation system may be used to train machine learning systems to perform complex CV tasks including object tracking, facial recognition, object classification, gesture tracking and control, object counting, 2D to 3D conversions, 3D scanning, simultaneous localization and mapping (SLAM), etc.

In summary, the synthetic image generation systems and methods provided by the present invention improve machine learning in the field of CV by reducing the time, cost, and photographic expertise required to generate datasets of images for training machine learning systems. Synthetic image data provided by the synthetic generation system is also more customizable, scalable, precisely controllable, and variable relative to image data produced by conventional methods. The synthetic image generation system may also rapidly generate large libraries of representative, highly varied synthetic images to avoid manual overfitting problems caused by truncated datasets. Additional image channels produced using encoded depth information present in scenes constructed by the synthetic image generation system further distinguish image data generated using the methods described herein from conventional techniques. By including depth data, image segmentation information, optical flow data, and noise information, image data provided by the synthetic image generation system is more complete and useful relative to image data generated by conventional methods.

Additionally, the synthetic image generation systems and methods described herein improve camera functionality by providing virtual simulations of device performance. By including identical parameters of actual camera devices in camera settings files used to generate projections of synthetic scenes, the synthetic image generation system allows virtual cameras to capture the same image plane as an actual camera device having the same location within a scene. Synthetic image capture using realistic parameters for camera settings accurately simulates device performance during capture. Post capture, the synthetic image generation system synthesizes synthetic images generated using camera settings of a particular device to provide feedback on the accuracy of depth information and camera calibration adjustments correcting for calibration errors that would be made by a camera capturing actual photos having the characteristics of the synthetic images.

Synthetic Image Datasets

Datasets for training and evaluating machine learning systems for CV applications must be sufficiently real, varied, and large. Most CV applications of machine learning perform classification, prediction, or generation tasks on real images. Therefore, synthetic images provided by systems and methods described herein are similar enough to real images to provide insight to machine learning systems about real images. Large machine learning systems should produce generalizable models capable of reliably performing tasks on a wide variety of images. For example, facial recognition models should be able to accurately identify faces regardless of age, gender, facial hair, ethnicity, glasses, hats, or other factors that differentiate one face from another. Similarly, models for generating depth maps should generate accurate depth information for a wide variety of scenes. To produce generalizable models, machine learning systems must be trained using a wide variety of images representative of the diverse image data models are expected to accurately process.

Synthetic image datasets provided by the systems and methods described herein are highly varied and rapidly scalable depending on the application of the machine learning system using the synthetic dataset as training data. The size of synthetic image datasets produced by the systems and methods described herein is rapidly iterative. The size of synthetic image datasets provided by the systems and methods described herein can be modified depending on the prevalence of manual overfitting, available computational and power resources, value of a loss and/or error function or other metrics, or other feedback describing training performance and/or model accuracy. As a baseline, the open source image dataset MPI Sintel includes 1024 images. Models trained using this dataset often experience manual overfitting limitations due to the small size of the dataset. Therefore, at minimum, synthetic image datasets for training large machine learning systems provided by the systems and methods of the present invention include more than 1024 images.

In some embodiments, synthetic image data provided by the synthetic image data generation systems simulates actual camera performance and calibration. The synthetic image data generation system defines the image planes captured in synthetic images using one or more camera settings files. By setting the parameters (e.g., camera intrinsics, camera extrinsics, camera calibration metadata, camera capture settings, etc.) included in the camera settings files to mirror parameters used in actual camera devices, the synthetic image data generation system can simulate the captured image quality, calibration accuracy, and camera performance under challenging capture conditions when capturing synthetic images. In other words, virtual cameras used to capture synthetic images generated by the synthetic image data generation system are set up identical to actual camera devices in order to simulate the performance of actual camera devices using a variety of camera capture settings in a variety of capture conditions. Methods of tuning camera devices to optimize performance may also be discovered and tested using synthetic images provided by the systems and methods described below.

Challenging conditions that may be simulated by the synthetic image data generation system include lens effects including lens flares, dirty lenses, and wide or narrow lens field of view. Low lighting, glare, and other natural image degradations (e.g., atmospheric effects including fog) may also be simulated by the synthetic image data generation system. Performance across the complete range of values of each camera capture settings (e.g., focal plane depth, baseline, focus, zoom, etc.) included in a camera device may also be simulated by images provided by the synthetic image data generation system. For synthetic images simulating performance of camera devices including multiple cameras (e.g., stereo camera devices and multi-camera devices) the relative positions of the cameras and the stereo extrinsic calibration parameters may also be included in camera settings files used by the synthetic image data generation systems to define image places captured in synthetic images produced by virtual cameras.

Image data provided by the synthetic image data generation system is compatible with a variety of machine learning systems including rules based classification algorithms, neural networks, and deep learning methods. More specifically, Naïve Bayes classification algorithms, decision tree classification algorithms, convolutional neural networks (CNNs), convolutional recurrent neural networks (CRNNs), hierarchical recurrent convolutional neural networks (HRNN), and HRNNs with attention vectors implemented in a machine learning framework (e.g., Keras, Scikitlearn, MXNet, or Tensorflow) are some example machine learning methods that may leverage training datasets provided by the synthetic image generation system. Using synthetic image data provided by the synthetic image data generation systems and methods described herein, machine learning systems may train one or more models to perform one or more CV tasks including generating disparity maps, depth maps, and other depth information; object tracking, classification, and counting; facial recognition; gesture tracking and control; 2D to 3D conversions; 3D scanning; image enhancement; image augmentation; and simultaneous localization and mapping (SLAM).

Image pixel data provided by the synthetic data generation system provided herein may include RGB color data, CMYK color data, grayscale color data, stereoscopic images and stereoscopic video, dual side by side images and video streams, 3D images and video streams formatted for playback on a flat display screen, 3D images and video streams formatted for playback on a 3D display screen, 3D images and video streams formatted for playback on a head mounted display (HMD) or other motion activated display, 180 degree field of view (FOV) VR or AR content, 360 degree FOV VR or AR content, and high resolution 2D or 3D images and video streams including full HD, 8K ultra HD, 720p, 1080p, 1080i, and 4320p content. Synthetic video content provided by the synthetic image data generation system may be formatted for streaming using a streaming protocol (e.g., Adobe RTMP, RTSP/RTP, MPEG-TS, ICY, or SHOUTcast/Icecast). Synthetic video data generated by the synthetic image data generation system may be encoded in a MP4, H.265/HEVC, H.264/AVC, VP9, VP8, MPEG4 Part 2, or MPEG2 file or stream or any other streaming format. In addition to synthetic images and videos, the synthetic image data generation system may also provide additional image channels including virtual ground truth depth or disparity; noise output including occluded areas, distorted objects, and image data dropout zones having one or more image degradation effects; optical flow data including a directional output and a velocity output; and image segmentation data including object segmentation maps, noise vs. signal segmentation maps, lens effect segmentation maps, and noise effect segmentation maps.

Synthetic Image Generation System Embodiments

With reference to FIGS. 1-4, non-limiting example embodiments of the synthetic image generation system and image data provided by the synthetic image generation system are described below. FIG. 1 provides an overview of one example image computing device implementing synthetic image generation system embodiments. Other embodiments may add, omit, and/or change the orientation of one or more components. In some embodiments, the example image computing device 100 includes a synthetic image generation system 101 including a plurality of components implementing routines and methods for generating and processing synthetic images described herein. The image computing device 100 may further include, a communication unit 110, memory 112, a processor 113, a storage device 111, and a display 116. The above components are communicatively coupled to an interconnect 115, for example, a high-bandwidth system bus, such as an Advanced High-performance Bus (AHB) matrix interconnects the electrical components of the 3D camera. Other possible interconnect 115 implementations include, for example, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (I9E) standard 1394 bus (sometimes referred to as "Firewire") or any other data communication system.

In some embodiments, the processor 113 comprises an arithmetic logic unit, a microprocessor, a general purpose controller, digital signal processors (DSPs), programmable controllers, application specific integrated circuits (ASICs), programmable logic devices (PLDs), logical circuitry, or some other processing elements configured to execute software code, manipulate data structures, perform computations, send and receive data from memory, generate image data, provide electronic display signals to a display 116 and/or otherwise process image data. The processor 113 can be embodied as a single- or multi-processor system executing an operating system that can implement a high-level module, e.g., a manager, to logically organize the information as a hierarchical structure of named directories, files, and special types of files called virtual disks at the storage devices. The processor 113 may process data signals and may include various computing architectures including a complex instruction set computer (CISC) architecture, a reduced instruction set computer (RISC) architecture, or an architecture implementing a combination of instruction sets. Although a single processor is illustrated in the image computing device 100 shown in FIG. 1, the image computing device 100 may include multiple processors including one or more CPUs, GPUs, and/or NPUs. The processor 113 is coupled to the interconnect 115 for communication with the other components. Other processors, operating systems, sensors, displays, and physical configurations may be possible.

A memory 112 may include a non-transitory memory that stores data for providing the functionality described herein. The memory 112 may be a dynamic random access memory (DRAM) device, a static random access memory (SRAM) device, flash memory or some other memory devices. In some embodiments, the memory 112 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 112 may store the code, routines, and data necessary for the imaging system 125 to provide its functionality. The memory 112 is coupled to the interconnect 115 for communication with the other components.

The communication unit 110 may transmit data to any network, client device, or server communicatively coupled to the image computing device 100. Similarly, the communication unit 110 may receive data from any network, client device, or server communicatively coupled to the image computing device 100 depicted in FIG. 1. Example client devices that may be communicatively coupled to the image computing device 100 include a personal computer, laptop, tablet computing device, smartphone, set top box, network-enabled television, smart watch or other wearable electronics device, internet of things device, robot, drone, specialized computing system, autonomous automobile or other connected transportation vehicle, camera device, etc. Server devices that may be connected to the image computing device 100 include any hardware server having a processor, a memory, and network communication capabilities (e.g., a data server, cloud server, data center, cloud computing instance, virtual machine, cloud storage device, etc.). The communication unit 110 is coupled to the interconnect 115 for communication with other components of the client device. In some embodiments, the communication unit 110 includes a port for direct physical connection to a network or to another communication channel. For example, the communication unit 110 may include a port such as a USB, SD, RJ, or similar port for wired communication with a client device. In some embodiments, the communication unit 110 includes a wireless transceiver for exchanging data with the client device, camera modules, other sensors, or other communication channels using one or more wireless communication methods, including IEEE 802.11, IEEE 802.16, BLUETOOTH®, or another suitable wireless communication method.

The communications unit 110 may interface with networks including a conventional type, wired, or wireless networks having numerous different configurations including a star configuration, token ring configuration or other configurations. Networks communicatively coupled to the communication unit 110 may include a local area network (LAN), a wide area network (WAN) (e.g., the Internet), or other interconnected data paths across which multiple devices may communicate. In some embodiments, the network may be a peer-to-peer network. The network may also be coupled to or include portions of a telecommunications network for sending data in a variety of different communication protocols. In some embodiments, the network may include Bluetooth communication networks, WIFI communication networks, or cellular communications networks for sending and receiving data including via short messaging service (SMS), multimedia messaging service (MMS), hypertext transfer protocol (HTTP), direct data connection, TCP, TCP/IP, WAP, email, etc.

In some embodiments, the communications unit 110 includes a cellular communications transceiver for sending and receiving data over a cellular communications network including via short messaging service (SMS), multimedia messaging service (MMS), hypertext transfer protocol (HTTP), direct data connection, WAP, TCP, TCP/IP, e-mail, or another suitable type of electronic communication. In some embodiments, the communication unit 110 includes a wired port and a wireless transceiver. The communication unit 110 also provides other conventional connections to a network for distribution of data using standard network protocols including TCP/IP, TCP, HTTP, HTTPS, SMTP, etc.

The storage device 111 can be a non-transitory storage medium that stores data for providing the functionality described herein. The storage device 111 may be a dynamic random access memory (DRAM) device, a static random access memory (SRAM) device, flash memory, or some other memory devices. In some embodiments, the storage device 111 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 111 is communicatively coupled to the interconnect 115 for communication with other components of the client device. In some embodiments, the storage device 111 may store data that was temporarily stored in the memory 112.

In some embodiments, the storage device 111 includes multiple ports having input/output (I/O) interface circuitry that couples to the disks over an I/O interconnect arrangement, e.g., a conventional high-performance, Fibre Channel (FC) link topology. In various embodiments, the I/O interface and the and the storage device 111 can be integrated into one device configured to connect to a switching fabric, e.g., a storage network switch, in order to communicate with other devices and the mass storage devices.

In some embodiments, synthetic image data generated by synthetic image generation system is rendered on a display 116 included in the image computing device 100. In one example the display 116 is a high resolution LCD or OLED display screen that can project synthetic or real images and video sequences including full HD, 8K ultra HD, 720p, 1080p, 1080i, and 4320p content. In other embodiments, the display 116 includes a 3D or holographic display screen capable of displaying synthetic or real content in 3D or 2D, for example, a light field display having diffractive lightfield backlighting (DLB) (e.g., a nano-textured diffractive light field backlighting holographic display or other two or four view display having multiple LCD layers with a directional backlight). The light field display systems may produce a 3D effect by rendering many different views (e.g., 64 or more) of the same object. Each view is perceptible at a particular viewing angle and may result from combining two unique stereo image or stereo video frame pairs. In some examples, the light field display is a 5.7 inch 2560×1440 pixel, 4-view display by Leia.

Alternatively, the display 116 may be a stereo display projecting stereo views of synthetic and real images and video sequences side by side. The display 116 may also be a VR display, (e.g., a head mounted display (HMD) or other headset). To view content generated by the synthetic image generation system 101 using a VR display, synthetic content generated from a plurality of virtual cameras modules may be stitched together and projected on the VR display according to motion information, (e.g., sensatory data from a gyroscope). In some embodiments, the plurality of virtual camera modules are arranged in a virtual scene with each camera pointing in a different direction to capture a virtual scene from a plurality of points of view. The different points of view can be stitched together to create a 180° or 360° ultra wide field of view landscape view of the virtual scene and each pixel in the landscape view may represent a slightly different direction relative to the neighboring pixels. During playback, the synthetic image generation system 101 may leverage the different directions and points of view included in the landscape view to project different perspectives of a virtual scene. Using the different perspectives, the synthetic image generation system 101 may also be able to generate depth information at many different viewing directions. This depth information may be used to render 3D content on the display 116. In some embodiments the image computing device 100 does not include a display 116 and instead the synthetic image generation system 101 projects synthetic images and video sequences on an external display system (e.g., a separate display device communicatively coupled to the synthetic image generation system 101).

The synthetic image generation system 101 may contain one or more software modules for providing the functionality described below. In the embodiment shown in FIG. 1, the synthetic image generation system 101 includes a synthetic image generation module 102, a training data pipeline 120, a camera tuning service, and a user interface 109. The synthetic image generation module 102 may include components for generating image scenes, synthetic images, augmented images, and additional image data channels. In one embodiment, the synthetic image generation module 102 includes a virtual camera application 122 including an image scene generator 124, an image projector 126, and a graphics rendering engine 128 as well as an image augmentation engine 104, and an additional image data rendering unit 106. The training data pipeline 120 may include components for indexing image data, compiling training datasets, and distributing training datasets to one or more machine learning systems. In one embodiment, the training data pipeline 120 includes a training data assembly service 103, a machine learning service 105, and an image indexing module 108.

The user interface 109 can be software including routines for interacting with the components of the synthetic image generation system 101. In some embodiments, the user interface 109 can be a set of instructions executable by the processor 113 to provide the functionality described below for interfacing with the components of the synthetic image generation system 101 to customize the performance and function of each component. In some embodiments, the user interface 109 can be stored in the memory 112 of the image computing device 100 and can be accessible and executable by the processor 113. The user interface 109 may be adapted for cooperation and communication with the processor 113 and other components of the image computing device 100 via an interconnect 115.

The user interface 109 provides a platform for communicating with multiple components of the synthetic image generation system 101 to control the generation and use of synthetic image and additional image data files. In some examples the user interface 109 is a digital interface comprising digital buttons for selecting and inputting control commands to synthetic image generation system components. The user interface 109 may display current settings for a selected component or show a preview of a synthetic image or additional image data channel that will be generated using the current settings. The user interface 109 may support real time changes to one or more synthetic image generation system settings. Embodiments of the user interface 109 may also include analog or mechanical control mechanisms (e.g., physical buttons). Current settings, the range of possible settings, and the setting type may be printed above or proximate to the set of physical buttons. Other embodiments of the user interface 109 include a digital display screen with physical buttons for inputting control commands.

In one embodiment, the user interface is organized as a set of views wherein each view controls a particular component of the synthetic image generation system. The view for controlling the synthetic image generation module 102 the user may display and allow users to change scene generation settings and/or parameters included in camera setting files. The view for controlling the image augmentation engine 104, may allow users to select the augmentation settings and display previews of augmented synthetic images. The view for controlling the image data generation module 106 may allow users to select additional image data channels to generate from a synthetic image and display a preview of the additional image data channel output. The view controlling the image indexing module 108 may allow users to select one or more indices to apply to synthetic image and additional image data files, list the amount of files to be indexed, and display a progress bar tracking progress of indexing operations. The view controlling the training data assembly service 103 may allow users to search and select synthetic image and additional image data files to include in training datasets. The view controlling the machine learning service 105 may allow users to select a machine learning system to progress training datasets generated by the training data assembly service. Feedback from one or more machine learning systems including training progress, processing performance, and accuracy of generated machine learning models may also be displayed on the machine learning service view included in the user interface 109. The view controlling the camera tuning service 107 may allow users to select a camera device for tuning and set parameters included in camera setting files. The camera turning service view controlling the camera tuning service 107 may also display the performance of virtual camera devices having camera setting parameters identical to the selected camera device. The user interface 109 may include a click through menu for navigating between the above views. The menu may arrange the different views as tabs, icons, panels, or any other arrangement.

Generating Synthetic Image Data

In one embodiment, the synthetic image data system 101 includes a synthetic image data generation module 102 for generating synthetic image data including synthetic images, augmented images, and additional image data channels. The synthetic image data generation module 102 may include a virtual camera application 122 generating synthetic images capturing camera views of an image scenes, wherein the image scene may be a virtual image scene or a synthetic image scene. As used herein, the term "image scene" describes image scenes created by the synthetic image data generation module 102 and may refer to—and be used interchangeably with—the terms "virtual image scene" and "synthetic image scene". As used herein, the term "camera view" describes a perspective for viewing an image scene provided by the direction, position, orientation, camera intrinsics, camera calibration metadata, and/or camera capture settings of a virtual camera device. The camera view of a virtual camera is modified by changing one or more parameters included in a camera settings file for the virtual camera device.

The virtual camera application 122 may include an image scene generator 124 for generating synthetic image scenes, and image projector 126 for projecting one or more camera views, and a graphics rendering engine 128 rendering synthetic images capture the one or more projected camera views. The synthetic image data generation module 102 may also include an image augmentation engine 104 adding one or more image degradations and/or effects to synthetic images to create augmented images. In some embodiments, the synthetic image data generation module 102 also includes an additional image data rendering unit (AIDRU) 106 rendering additional image data channels (e.g., depth information, image segmentation maps, optical flow information, feature/object generation information, object/feature tracking information, face identification models, noise maps, and occlusion maps) at camera views captured in a synthetic image.

Camera views captured in synthetic images may be a realistic representation of an image scene perspective captured by an actual camera device for example a smartphone camera (e.g., a 12 megapixel (MP), 1.8 lens aperture (f), 26 mm (zoom), phase detection auto focus (PDAF), Quad-LED dual-tone flash, HDR camera mounted on an iphone X; a dual 12.3 MP, PDAF, Dual-LED, HDR, H4V holographic video stereo camera mounted on a RED Hydrogen One; or a quad camera mounted to a Huawei p30 pro camera including a 40 MP, 1.6f, 27 mm, PDAF wide angle lens camera, a 20 MP, 2.2f, 16 mm, PDAF ultrawide angle lens camera, a Periscope 8 MP 3.4f, 125 mm, PDAF, telephoto lens camera, and a time of flight (TOF) 3D camera), stereo camera, or a digital video camera. In one embodiment, camera views captured by the virtual camera application 122 are determined in camera settings files described below in FIGS. 5-7. The parameters included in camera settings files may be setup identical to an actual camera device in order to create camera views capturing a realistic, camera specific representation of an image scene perspective. By including parameters for camera intrinsics, camera calibration metadata, and camera capture settings in the camera settings file that are identical to actual camera device, the synthetic image generation module 102 may generate synthetic images simulating capture performance of the actual camera device under different capture conditions.

The synthetic image generation module 102 can be software including routines for generating synthetic image data including synthetic images and videos comprising color image pixel data and additional image data channels. In some embodiments, the synthetic image generation module 102 can be a set of instructions executable by the processor 113 to provide the functionality described below for generating virtual image scenes and projecting perspectives of the generated virtual image scenes as synthetic image data. In some embodiments, the image generation module 102 can be stored in the memory 112 of the image computing device 100 and can be accessible and executable by the processor 113. The synthetic image generation module 102 may be adapted for cooperation and communication with the processor 113 and other components of the image computing device 100 via an interconnect 115.

Scene Generation

Embodiments of the synthetic image generation module 102 include an image scene generator 124 creating virtual scenes. In one embodiment, the image scene generator 124 creates virtual image scenes by combining background images, scene objects, and textures. Virtual scenes may be rendered by the graphics rendering engine 128 in 2D (i.e., include x and y image pixel data only) or in 3D (i.e., include x and y image pixel data and depth information). In some embodiments, depth information includes disparity and/or depth values. Depth information may be encoded into image pixel data along with additional image data channels (e.g., direction vectors, speed vectors, other optical flow information, image segmentation data, noise vectors, occlusion vectors, etc.). Virtual scenes may be assembled using a graphics rendering engine 128 (e.g., Blender or Unity) or a custom scene creation library, framework, program, application, or other implementation.

Background images are added to a background portion of the image scene by the image scene generator 124. Background images may include unaltered 2D landscape, cityscape, mountain images, and other photographs. In some embodiments, background images may be assembled or altered using resolution manipulation techniques. The image scene generator 124 may assemble background images by forming a large textured ground plane comprising a solid color, gradient color, or textured 2D image overlaid with a selection of static background objects having shapes randomly chosen from cubes, polyhedrons, cuboids, and cylinders. To add variation to the background image, the synthetic image generation module 102 may scale, rotate, texture, and/or deform one or more objects before placing the object(s) in the 2D image. In some embodiments, resolution manipulation techniques used by the image scene generator 124 to generate background images include slicing a raw, full resolution background image (e.g., 1920×1080) into four (e.g., 480×270) or more image sections. A background image may then be assembled from the image sections by selecting an image section and upsampling image pixel data within the image section to provide a full resolution background image. In one embodiment having 480×270 image sections, an upsampling factor of 2 may be used to generate 960×540 full resolution background image. In other embodiments having 480×270 image sections, an upsampling factor of 4 is used to generate a 1920×1080 full resolution background image.

After generating the background image and adding the background image to a background portion of the image scene, the image scene generator 124 populates the image scene by adding foreground objects to the foreground portion of the image scene. In some embodiments, foreground objects are selected from a 3D model library including 36,000 or more 3D objects including chairs, tables, cars, animals, faces, etc. In other embodiments, foreground objects include light sources illuminating image scenes to provide light captured by virtual camera modules during generation of synthetic images. 3D model foreground objects may comprise a three dimensional mesh structure comprising points and/or a polygon mesh outlining a specific shape. In some embodiments, the dimensionality of the 3D models is very high with some three dimensional mesh structures including 10,000 to 500,000 points and/or polygons. For scenes used to generate synthetic training data for machine learning systems, a portion of the objects in the 3D model library (e.g., 5% to 10% or more) may be separated from the original 3D model library into a validation 3D model library. During scene generation, the image scene generator 124 selects five to twenty objects from the original 3D model library including 95% to 90% or less of the total 3D objects to generate synthetic images comprising the training dataset. To generate synthetic images comprising the validation dataset for testing the performance of the trained machine learning model, the image scene generator 124 populates validation image scenes with five to twenty objects from the validation 3D model library including 5% to 10% or more of the total 3D objects.

In some embodiments, a similar object filter may be incorporated into the 3D model selection routine performed by the image scene generator 124 to populate background images with 3D models and/or other foreground objects. The similar object filter synthesizes a set of 3D models and/or other foreground objects selected for placement in a scene and excludes 3D models and/or other foreground objects having similar features to one or more of the other 3D models and/or other foreground objects included in the set. The 3D model selection routine may then select a new, replacement 3D model and/or other foreground object from the 3D model library and re-run the similar object filter. This process is repeated until every 3D model and/or other foreground object included in the set of objects selected for placement includes distinct features relative to the other objects in the set. The image scene generator 124 may further adjust the number and type of 3D models and/or other foreground objects selected by the 3D model selection routine to minimize scene complexity thereby optimizing training datasets and validation datasets for rapid processing by a machine learning system.

The 3D models and other foreground objects selected by the 3D model selection routine may be specific to the intended CV application of the synthetic images produced by the synthetic image generation system 101. A 3D model arrangement routine executed by the image scene generator 124 to position the 3D models and other foreground objects in a foreground portion of the scene may also be specific to the application of the synthetic images. The 3D model arrangement routine may define the horizontal and vertical location and depth of each object (e.g., 3D models and other foreground objects) in a scene. In one embodiment, to produce image scenes for generating synthetic images to train machine learning systems for object detection in autonomous vehicles, the image scene generator 124 selects objects commonly found near and/or on roads (e.g., cars, trucks, buses, trees, buildings, humans, animals, traffic lights, traffic signs, etc.) and positions the objects to generate a scene resembling the point of view from a car driving on the road. One or more affine transformations may also be applied to one or more background and/or foreground objects in the scene to simulate motion.

In another embodiment producing image scenes for generating synthetic images to train machine learning systems for image segmentation, the image scene generator 124 selects objects having complex depth patterns (e.g., humans and/or animals with hair, fences with small openings between the panels, a wine glass sitting on a flat surface). To facilitate segmentation, the image scene generator 124 positions the objects at a wide variety of depths within a scene with each object or group of objects placed on a depth plane having a unique distance away from the capturing virtual camera relative to the other objects in the scene.

In other embodiments providing image scenes for generating synthetic images to train machine learning systems for generating depth maps, the image scene generator 124 randomly selects objects from a library of 3D models. The image scene generator 124 then arranges the randomly selected objects at random depths within the scene. The wide selection of 3D models included in scenes makes the synthetic images included in the training dataset generated from the image scenes representative of most objects captured by a camera device. The variety of depth values for each object, allows the training data to simulate a wide range of possible object depths. To improve the efficiency of training machine learning systems for generating depth information, the image scene generator 124 may position foreground objects at a depth between the depth of the capturing virtual camera module and the depth of the convergence plane (i.e., zero disparity plane) for a particular camera module specified in the camera settings file. Objects positioned beyond the depth of the convergence plane have the same position in the left and right stereo images, therefore provide no useful disparity information. Training networks to generate depth information from stereo images require disparity information included in right and left stereo images. As such, training data including objects placed beyond the zero disparity plane includes superfluous information for purposes of training depth generation networks.

After performing a 3D model arrangement routine to place objects in a scene, the image scene generator 124 selects one or more textures to add to each object. To add textures to irregular objects (e.g., 3D models comprising a polygon mesh), the image scene generator 124 may individually apply the same or different texture files to each polygon in the polygon mesh. To ensure the correct portion of a texture file covers the proper area of the three dimensional mesh structure of a 3D object, one or more attachment points included in the mesh structure may map to one or more areas of a texture file. Textures may be selected from a library of texture files including solid color vectors, gradient color vectors, materials, surfaces, high resolution images, actual textures representing the appearance of objects in the real world, abstract textures depicting the appearance of fictional objects, etc. Additionally, texture files may be created from any image processed by the synthetic image generation module 102. In some embodiments, the image scene generator 124 randomly selects texture files to add to objects placed in a scene. In other embodiments, the image scene generator 124 selects a texture file associated with an object in the scene to give the object a realistic appearance. The image scene generator 124 may also add animation effects (e.g., object movement, wind, shading, light glare, etc.) after the background image, foreground objects, and textures have been assembled as a scene to allow capture of moving objects in synthetic images.

Synthetic Image Projection

The image projector 126 further processes image scenes from the image scene generator 124 to generate camera views rendered as synthetic images by the graphics rendering engine 128. In some embodiments, the synthetic image generation module 102 produces many synthetic images for each created scene. Each synthetic image captures the scene from a unique perspective by generating a camera view (i.e., a 2D projection) of a 3D scene. The point of view included in each camera view is defined by the image plane(s) of one or more virtual cameras placed within the scene. To capture different perspectives, the image projector 126 may place multiple virtual cameras in a scene and/or change the position of one or more virtual cameras. The image plane, camera view, camera position, and camera capture settings for each virtual camera module are defined in a camera settings file. To simulate performance of camera devices in the real world, virtual camera parameters included in a camera setting file may be identical to parameters of an actual camera device (e.g., a smartphone camera, VR camera, 3D camera, or other digital camera device).

Figure 2:
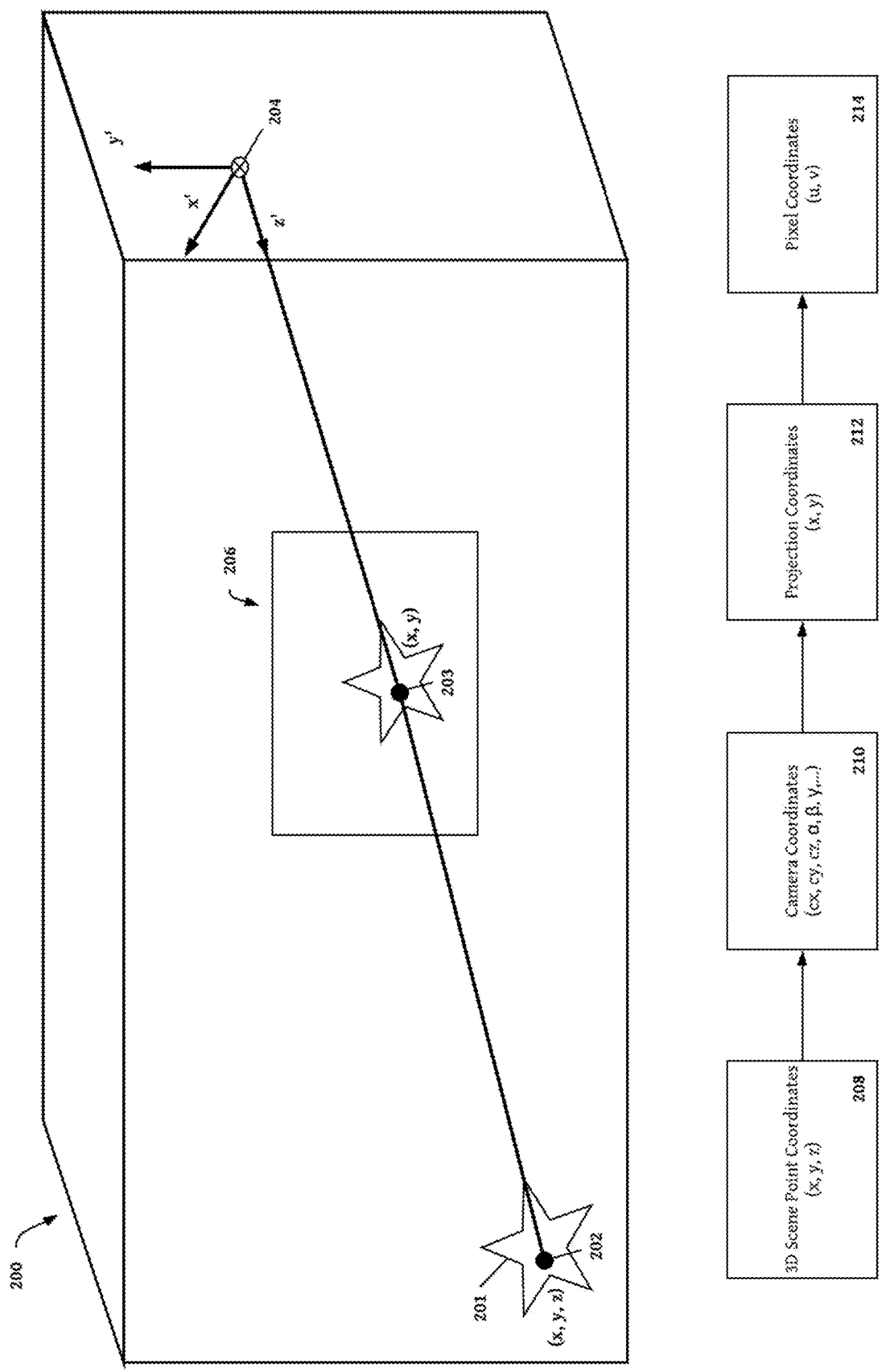
FIG. 2 is an image projection diagram showing an example process for capturing synthetic images of a 3D scene.

One embodiment for generating a camera view including a 2D projection of an image scene implemented by the image projector is illustrated in FIG. 2. The conceptual diagram shown in FIG. 2, includes a 3D image scene 200 having cuboid dimensions. In other embodiments, the image scene 200 is a 2D image scene having rectangular dimensions. The 3D image scene 200 includes a 3D star object 201 comprising a set of points including point 202 having location coordinates (x, y, z) in a 3D Cartesian space. The 3D scene also includes one virtual camera 204 having camera coordinates (i.e., cx, cy, cz, etc.) 210 describing a position of a virtual camera 204 within the 3D image scene 200. Camera coordinates describing the position of a virtual camera within a 3D space are referred to as 3D Cartesian camera coordinates. The camera coordinates 210 may also include one or more rotation position parameters describing the Euler angles of rotation (e.g., a-pitch, n-roll, y-yaw) for each virtual camera module. Camera coordinates 210 may also include camera intrinsic parameters (e.g., focal length, distortion center, distortion coefficients, lens field of view, etc.) and camera calibration metadata (e.g., intrinsic calibration metadata, stereoscopic calibration metadata, dynamic calibration metadata, etc.).

To generate a camera view including a 2D projection of a 3D scene 200, the image projector 126 attempts to project every point included in each object (e.g., the 3D star object 201) placed in a 3D image scene 200 onto some 2D point of a 2D surface. Specifically, the image projector 126 projects a point 202 included in a 3D Cartesian space onto a 2D point 203 of a 2D surface 206, wherein the 2D surface 206 is the image plane of a virtual camera 204 at a camera position defined by the camera coordinates 210 included in the camera setting file for the virtual camera 204. By executing a projection operation, the image projector 126 converts 3D scene point coordinates 208 describing points in a 3D Cartesian space (e.g., x, y, z) to projection coordinates (e.g., x, y) 212 describing points in a 2D Cartesian space defined by the camera coordinates 210. In one embodiment, the projection operation comprises applying a projection equation to 3D scene point coordinates 208 for every point included in each object placed in the 3D scene 200. To expedite execution of the projection operation, the image projector 126 may use a projection matrix to apply the projection equation to a matrix representation of a 3D object, wherein the matrix representation includes 3D scene point coordinates 208 for every point included in the 3D object.

Depending on the position of the virtual camera module 204 within the 3D scene 200, different points included in the 3D object will be projected onto a 2D surface. Therefore, the image projector 126 may generate multiple camera views for each image scene with each camera view including a unique perspective of the image scene. In one embodiment, the image projector 126 generates a plurality of camera views by modifying one or more camera coordinates 210 included in a camera setting file. Depending on the application of the synthetic images produced by the synthetic image generation module 102, the camera coordinates 210 may be consistently and/or incrementally varied for each image scene generated during production of a particular synthetic image dataset to ensure the synthetic image dataset includes synthetic images capturing a consistent set of camera views for every scene. Alternatively, the camera coordinates 210 may be modified randomly by the image projector 126 to introduce additional variation into a synthetic image dataset.

To generate a synthetic image, graphics rendering engine 128 renders projection coordinates 212 included in the image plane as pixel coordinates 214 of a synthetic image. In one embodiment, pixel coordinates are represented by u and v coordinates. In this example, u is an upward horizontal distance relative to an origin in a bottom-left corner of an image and v is a vertical distance from the origin. Coordinates u and v describe a position in a 2D pixel representation of an image so that the combination of u and v describe a particular pixel within a pixel coordinate space. Values for v and u are restricted to positive real integers because they reference pixels in a synthetic image. In one embodiment, the rendering performed by the graphics rendering engine 128 includes shifting the origin of the 2D projection coordinate space to the lower left corner of the pixel coordinate space and applying an affine transformation (e.g., a translation, rotation, skew scale, etc.) to projection coordinates (x, y) 212 to generate pixel coordinates (u, v) 214. To expedite rendering, the graphics rendering engine 128 may use a conversion matrix to perform the origin shift and affine transformation on a matrix representation of a 2D projection, wherein the matrix representation includes projection coordinates 212 for every point included in the 2D projection.

In some embodiments, the scene generator 124 may place two cameras inside an image scene, wherein the two cameras are configured as stereo cameras having stereo calibration parameters describing the relative positions for each camera module. Camera coordinates included in the camera setting file for the first stereo camera define a first image plane comprising a 2D surface for projecting 3D object points included in a 3D scene onto 2D projection points generating a first synthetic stereo image. Camera coordinates included in the camera setting file for the second stereo camera define a second image plane comprising a 2D surface for projecting 3D object points included in a 3D scene onto 2D projection points for generating a second synthetic stereo image. The image projector 126 applies a projection operation to each 3D coordinate for every point included in each object within a 3D scene to generate a first set of stereo projection coordinates describing 2D projection points on the first image plane and a second set of stereo projection coordinates describing 2D projection points on the second image plane. To generate a synthetic stereo image pair, the graphics rendering engine 128 then renders the first and second sets of stereo projection coordinates as first and second sets of pixel coordinates, wherein the first set of pixel coordinates provides the first synthetic stereo image capturing a first stereo camera view and the second set of pixel coordinates provides the second synthetic stereo image capturing a second stereo camera view.

Synthetic images including single images and stereo image pairs generated by the synthetic image generation module 102 may be written to memory 112 or otherwise stored in one or more databases, dataframes, image files, and/or other data stores included in a storage device 111. Databases and other collections of synthetic images written to memory 112 and/or stored in a storage device 111 may be indexed, organized, tagged, cleaned, modified, or otherwise processed by the image indexing module 108. The training data assembly service 103 may search for and collect synthetic images from one or more databases or other datastores included in a storage device 111 using one or more metadata indices provided by the image indexing module 108. The training data assembly service 103 may then transfer collections of synthetic images to the machine learning service 105 as training datasets for processing by one or more machine learning systems.

Generating Depth and Other Image Data Channels

The additional image data rendering unit (AIDRU) 106 can be software including routines for generating additional image data channels including depth information, image segmentation data, optical flow information, capture noise data, and other data produced from image pixel data. In some embodiments, the AIDRU 106 can be a set of instructions executable by the processor 113 to provide the functionality described below for generating additional image data channels from processing image pixel data. In some embodiments, the AIDRU 106 can be stored in the memory 112 of the image computing device 100 and can be accessible and executable by the processor 113. The AIDRU 106 may be adapted for cooperation and communication with the processor 113 and other components of the image computing device 100 via an interconnect 115.

Embodiments of the AIDRU 106 ingest synthetic image data provided by the synthetic image generation module 102 to produce one or more additional image data channels. In one embodiment, the AIDRU 106 renders depth data (e.g., a depth map) for a synthetic image by associating pixel coordinates of a synthetic image with ground truth depth information describing a distance between a point included in an synthetic image pixel and a virtual camera capturing the synthetic image. For synthetic images capturing image scenes generated by the scene generator 124, depth information is known. During scene assembly, an object arrangement routine executed by the scene generator 124 sets the depth of each foreground object and background image placed within a 3D scene. Camera coordinates used during image projection define the position of each virtual camera capturing synthetic images. Therefore, the depth of the virtual camera is also known. By comparing the depth of every point included in each object within the virtual camera's field of view to the depth of the capturing virtual camera, the camera application 122 and/or AIDRU 106 determines ground truth depth information for each pixel included in a synthetic image. The AIDRU 106 may render ground truth depth information during synthetic image generation by associating the background image and each point in each 3D model included in an image scene with a depth value.

In other embodiments, the AIDRU 106 generates depth information by synthesizing a pair of synthetic stereo images produced by the synthetic image generation system 102. Using view disparity, depth information is ascertainable from stereo image pairs. View disparity or more simply disparity refers to the difference in location of the same object in right and left stereo images due to the parallax effect caused by the orientation of two stereo camera modules. Parallax is an observable difference in the apparent position of an object viewed along two different lines of sight and may occur in stereo camera systems including two camera modules separated by a constant distance in a particular direction (e.g., horizontal separation or vertical separation). In some embodiments, the parallax effect is adjustable by changing the baseline camera setting (e.g., distance between two stereo camera modules) or varying the convergence projection setting (i.e., the depth of the zero disparity plane). Mathematically, the disparity of a pixel is equal to the shift value that leads to a minimum sum of squared differences for that pixel (i.e., the lowest difference between the sum of squared differences and the sum of absolute differences). Disparity calculated for a stereo image pair may be converted into depth information using the equation below:

$$D=x-x'=Bf/Z \text{ where}$$

x and x' are the distance between points in an image plane corresponding to the 3D scene point and their camera center B=the distance between two cameras (i.e., the baseline)

f=the focal length of the camera and

Z=the depth of a point in the scene

By executing the above equation on every point included in each object within the virtual stereo camera's filed of view, the AIDRU 106 generates depth information for each object in a synthetic stereo image pair. The AIDRU 106 may then associate the depth information with a grayscale color gradient to generate a depth map for each synthetic stereo image as an additional image data channel. In one embodiment, the depth map conveys depth information in grayscale color, wherein close objects have a white hue and far objects have a darker hue, with objects positioned beyond the zero disparity plane having a black appearance.

Figure 3:
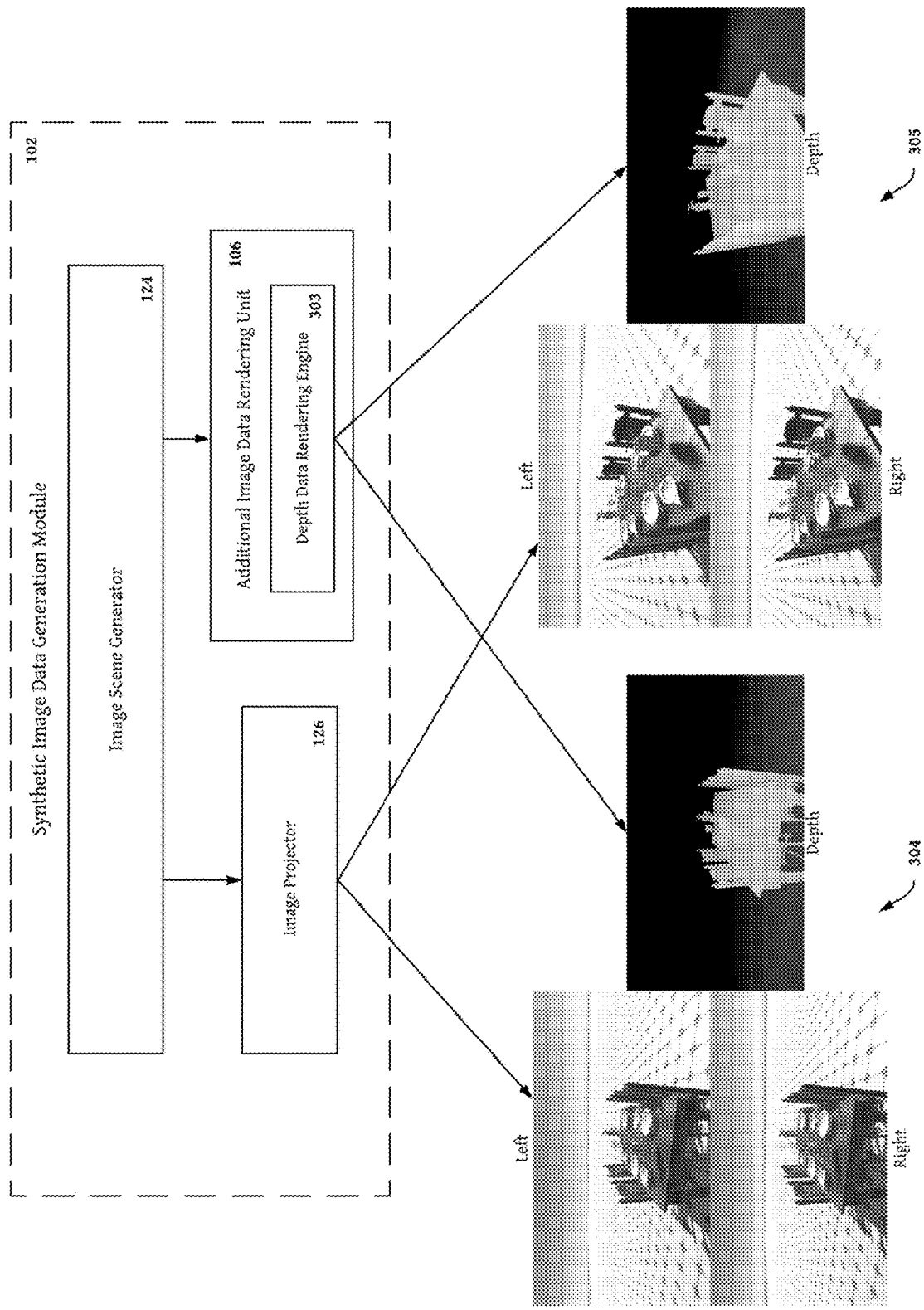
FIG. 3 shows a sample set of synthetic image outputs provided by the synthetic image generation module including synthetic stereo images and depth maps.

Example ground truth depth data generated by the AIDRU 106 is shown in FIG. 3. In some embodiments, components of the synthetic image generation module 102 including the image scene generator 124 and the image projector 126 provide synthetic right and left stereo images. The image scene generator 124 may construct a 3D scene including one or more background images, 3D foreground objects, and textures as described above. The image projector 126 may generate synthetic images of the 3D scene according to the position of one or more virtual cameras as described above in FIG. 2. In the example shown in FIG. 3, the image projector 126 generates two sets of stereo images capturing four different perspectives of a dinning table scene generated by the image scene generator 124. The stereo images generated by the image projector 126 are rendered by the graphics rendering engine 128. Synthetic images capturing right and left stereo views of a first perspective showing the head of the table are included in a first image data sample 304. Synthetic images capturing right and left stereo views of a second perspective showing the side of the table are included in a second image data sample 305.

In some embodiments, synthetic images captured by the image projector 126 include encoded depth information describing the distance from the capturing virtual camera for each point included in the 3D scene. The depth data generation module 303 included in one example AIDRU 106 embodiment may use the encoded depth information to generate ground truth depth information for every point captured in the left and right stereo images. Example depth maps generated by the depth data generation module 303 for the dining table perspective and the second dining table perspective are shown in the first image data sample 304 and the second image data sample 305 respectively. As shown in FIG. 3, depth maps generated by the depth data generation module 303 may represent depth as a grayscale color gradient wherein close objects appear white in color and far objects appear black in color.

In other embodiments, the depth data generation module 303 may calculate depth information using the view disparity between the right and left stereo image views. To provide the depth maps shown in the first image data sample 304 and the second image data sample 305, the depth data generation module 303 may first calculate the view disparity for every point captured in a pair of synthetic left and right stereo images by determining the Euclidian and angular differences between the position of a point in the synthetic right and left stereo images. Alternatively, the depth data generation module 303 may retrieve disparity information encoded into the right and/or left synthetic stereo images. Using the disparity information the depth data generation module 303 may calculate depth information for each point using the equation: $D=x-x'=Bf/Z$. The depth data generation module 303 may then generate a depth map representing the depth information as a grayscale color gradient wherein close objects appear white in color and far objects appear black in color.

The AIDRU 106 may use depth data included in a depth map to generate an image segmentation map separating objects included in a synthetic image based on the depth of each object. In some embodiments, the image segmentation map may separate synthetic images into depth layers (e.g., foreground, middle ground, and background layers), wherein each depth layer contains objects positioned within a range of distances from the camera device. For more precise applications requiring segmentation with low error or within narrow depth ranges, additional sub layers may be added to the segmentation maps provided by the AIDRU 106. In some embodiments, image segmentation maps may display only the objects within a particular depth layer in a grayscale or color representation. In other examples, image segmentation maps may represent depth layers using a color gradient that assigns a different hue and/or intensity of the same color to objects included in different depth layers. Image segmentation maps may also represent objects included in each depth layer with a different color or texture.

To leverage image segmentation data in training machine learning systems. Image segmentation maps generated by the AIDRU 106 may be included in training datasets provided by the synthetic image generation system 101. The AIDRU 106 may also embed, encode, or otherwise incorporate segmentation data into depth vectors and/or image pixel data to improve transferability of segmentation data and/or reduce time and complexity of processing combined image, depth, and segmentation data. Machine learning systems may process training datasets including segmentation maps and/or image data or depth vectors having encoded segmentation data to generate models for object classification, object tracking, depth data generation, and/or image segmentation data generation.

Additional image data channels generated by the AIDRU 106 include optical flow information, noise data, and occlusion maps. Optical flow information includes object direction information, object velocity data, and other information vectors describing a change in position of an object from one sequential image or video frame to the next. In some embodiments, the AIDRU 106 generates object velocity data by determining displacement of an object and relating displacement to time. An object's displacement may be determined by calculating the location of a point included in an object in a first image and comparing the location of the same point in a second image or video frame captured before or after the first image. The AIDRU 106 may then determine the difference in capture time of the two sequential images or frames and calculate velocity by obtaining the quotient of the point's displacement and the difference in image capture time. Repeating this process for every point included in an object provides the velocity for the object.

The AIDRU 106 may also determine a direction vector describing the direction of an object's motion by associating point displacement values with position information. In one example, the displacement for a point included in an object is associated with the position (e.g., coordinates describing a location on a 2D grid system) of the pixel including the point in a first sequential image and the position of the pixel including the point in a second sequential image. The direction vector produced by associating displacement with position may be expressed as a pair of x' and y' coordinates wherein the x' coordinate describes the difference in the x coordinates of the position information for the point the first image and the second image and the y' coordinate describes the difference in the y coordinates of the position information for the point in the first and second images. In other examples, the coordinates may be converted to angular coordinates describing the direction of an object's motion in degrees within the polar coordinate system.

Optical flow information may be represented in an object direction map including direction vectors for every pixel in an image. The AIDRU 106 may also express optical flow information as an object velocity map including velocity direction vectors for every pixel in an image. Optical flow maps including object flow vectors assembled by combining direction and velocity vectors may also be generated by the AIDRU 106. Optical flow information may also be embedded, encoded, or otherwise combined with image pixel data, depth information, image segmentation information or any other image data provided by the synthetic image generation system 101. Optical flow information may be included in training data processed by machine learning systems to generate models providing for object classification, object tracking, object navigation, location prediction, and/or optical flow information generation. Optical flow information provided by the AIDRU 106 may also be used to evaluate the performance of SLAM algorithms or other object tracking techniques.

Noise data and occlusion maps may also be generated by the AIDRU 106. Noise data includes noise output including occluded areas, distorted objects, and image data dropout zones having one or more image degradation effects; optical flow data including a directional output and/or speed output; and image segmentation data including object segmentation maps, noise vs. signal segmentation maps, lens effect segmentation maps, and noise effect segmentation maps.

In one embodiment, the AIDRU 106 generates additional image data channels by modifying the synthetic image generation module 102 internal rendering engine. Post scene generation and RGB stereo image capture by the image generation module 102, the AIDRU 106 may perform additional passes over generated scenes to create one or more additional image data channels. The synthetic image generation module 102 rendering engine has full knowledge about all visible and invisible scene points ensuring efficient generation and high accuracy of additional image data generated by the AIDRU 106. To improve performance, the AIDRU 106 may modify one or more settings of the synthetic image generation module 102 internal rendering engine including image size, virtual camera sensor size and format, focal length, and lens field of view. Additional passes by the AIDRU 106 may occur for every image frame and scene view captured by the image generation module as defined by virtual camera position data and calibration parameters included in camera setting files. Therefore, the AIDRU 106 may generate additional image data (e.g., depth information, segmentation maps, optical flow data, facial recognition models, feature maps, noise data, and occlusion maps) for every virtual camera included in a scene and every synthetic image generated by the image generation module 102. Additional image data channels provided by the AIDRU 106 may also be specific to the unique scene perspective included in each captured image plane.

Additional image data files provided by the AIDRU 106 may be written to memory 112 or otherwise stored in one or more databases, dataframes, image files, and/or other data stores included in a storage device 111. Databases and other collections of additional image data files written to memory 112 and/or stored in a storage device 111 may be indexed, organized, tagged, cleaned, modified, associated with corresponding synthetic images, or otherwise processed by the image indexing module 108. The training data assembly service 103 may search for and collect synthetic images and corresponding additional image data files from one or more databases or other datastores included in a storage device 111 using one or more metadata indices provided by the image indexing module 108. The training data assembly service 103 may then transfer collections of synthetic images and additional image data files to the machine learning service 105 as training datasets for processing by one or more machine learning systems.

Image Augmentation

The image augmentation engine 104 can be software including routines for augmenting synthetic image data with noise and other defects. In some embodiments, the image augmentation engine 104 can be a set of instructions executable by the processor 113 to provide the functionality described below for generating augmented versions of synthetic images provided by the synthetic image generation module 102. In some embodiments, the image augmentation engine 104 can be stored in the memory 112 of the image computing device 100 and can be accessible and executable by the processor 113. The image augmentation engine 104 may be adapted for cooperation and communication with the processor 113 and other components of the image computing device 100 via an interconnect 115.

In some embodiments, it may be desirable to modify synthetic images provided by the synthetic image generation module 102 with noise and other defects. To increase the amount of variation in a synthetic image dataset, the image augmentation engine 104 may add noise and distortion to synthetic images. By adding other effects (e.g., lens flare, lens distortion, motion blur, and Gaussian blur), the image augmentation engine 104 may also simulate realistic capture errors that commonly occur under certain conditions with specific camera hardware. In other embodiments, the image augmentation engine 104 may execute one or more edge detection algorithms to identify points in a digital image at which the image brightness changes sharply or has discontinuities. Discontinuities and other sharp changes in brightness typically correspond to changes in depth, surface orientation, material properties, and scene illumination, therefore capture import events included in a captured scene. Augmenting edges onto synthetic images provided by the synthetic image generation system 101 organizes objects captured in synthetic image into sets of line segments than can be efficiently processed to perform feature detection and feature extraction tasks.

Figure 4:
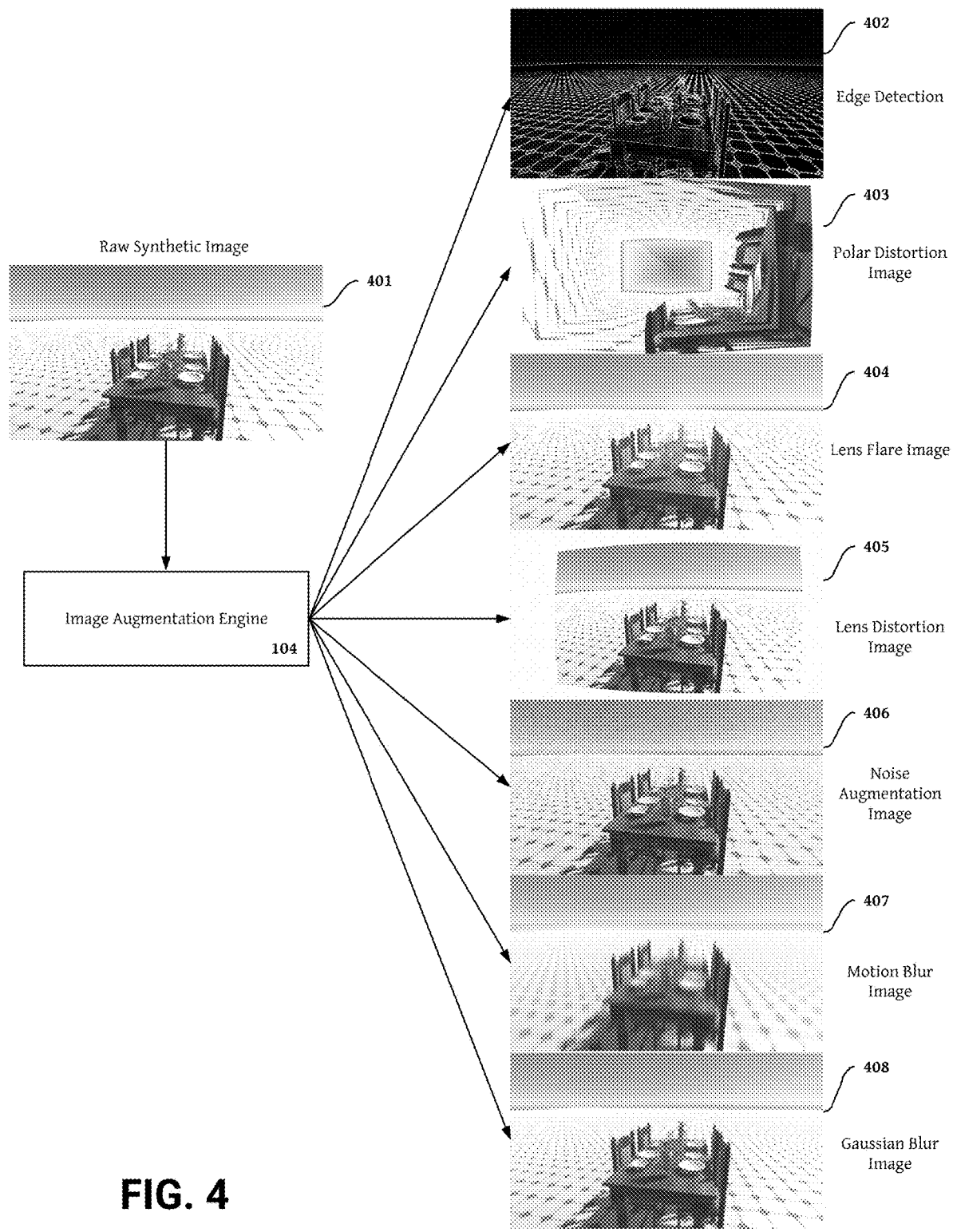
FIG. 4 shows a sample set of augmented synthetic image outputs provided by the synthetic image generation module including synthetic images augmented by an image degradation or effect.

The image augmentation engine 104 generates augmented images by modifying pixel coordinates with one or more image degradations or image effects. To create a larger, more robust, and more realistic training datasets, augmented images are added to training datasets incorporating synthetic images and additional image data. Examples of augmented images generated by the image augmentation engine 104 are shown in FIG. 4. In one embodiment, the image augmentation engine 104 ingests a raw synthetic image 401 generated by the synthetic image generation module 104 and performs one or more augmentation operations. To generate an edge detection augmentation image 402, the image augmentation engine 104 performs an edge detection augmentation operation representing each objet captured in the raw synthetic image 401 as a set of edges. The edge detection augmentation operation may include an edge detection algorithm having a Canny operator, Deriche operator, a differential operator, Sobel operator, a Prewitt operator, and/or a Roberts cross operator. Similar to the additional image data channels generated by the AIDRU 106, edge detection augmentation images 402 may be included in synthetic image training datasets along with—or independent of— their corresponding synthetic images. Training datasets including edge detection augmentation images 402 may be used to In other embodiments, the image augmentation engine 104 augments raw synthetic images with noise and other defects by performing one or more augmentation operations. To generate a polar distortion image 403, the image generation engine performs a polar distortion operation mapping rectangular pixel coordinates to circular polar coordinates. In one example, a polar distortion operation coverts rectangular pixel coordinates (i.e., u, v) to polar coordinates (i.e., r, θ) using the following equations:

$$r^2 = x^2 + y^2$$

$$\tan(\theta) = y/x$$

In other examples, a polar distortion operation coverts polar coordinates (i.e., r, θ) into pixel coordinates (i.e., u, v) using the following equations:

$$u = r \cos(\theta)$$

$$v = r \sin(\theta)$$

The image augmentation engine 104 may apply a polar distortion operation to generate a polar distortion image 403 from a variety of viewpoints. In some embodiments, the image augmentation engine 104 applies a polar distortion operation mapping pixel coordinates using the top left corner of the image as the origin. Mapping from the top generates a circular view having an occlusion zone in the middle of the image as shown in the example polar distortion image 403. In other examples, the image augmentation engine 104 applies a polar distortion operation mapping pixel coordinates using the lower right corner of the image as the origin. Mapping pixel coordinates to polar coordinates backwards generates a circular view having an occlusion zone around the outside of the circular view. The image augmentation engine 104 may also apply other polar distortion operations mapping pixel coordinates to polar coordinates using other origin locations to generate circular views having occlusion zones in other positions.

Other image degradations provided by the image augmentation engine 104 include Gaussian noise and Gaussian blur. In some embodiments, the image augmentation engine 104 creates noise augmentation images 406 and Gaussian blur images 408 by applying a Gaussian augmentation operation to a raw synthetic image 401. Gaussian augmentation operations distribute a defined amount of noise (e.g., occlusion or blurring) evenly throughout an entire image. In other embodiments, the image augmentation engine 104 may degrade raw synthetic images 401 by applying augmentation operations providing for a non-uniform distribution of noise across entire images and/or particular locations within an image. The amount of noise applied by the image augmentation engine using Gaussian and non-Gaussian augmentation operations may be customized to diversify the synthetic images provided by the synthetic image generation system 101.

To simulate other image degradations that may occur under certain capture conditions and/or when using a particular type of camera hardware, the image augmentation engine 104 may apply one or more condition augmentation operations and/or hardware augmentation operations to raw synthetic images 401. Condition augmentation operations include one or more flare augmentation operations generating lens flare augmentation images 404 simulating a lens flare effect observable as a glare when capturing scenes under certain lighting conditions (e.g., capture in direct sunlight or capturing objects reflecting sunlight). Other condition augmentation operations applied by the image augmentation engine 104 include motion augmentation operations generating motion blur augmentation images 407 simulating a blurring effect observable in images capturing moving objects. The image augmentation engine 104 may also apply one or more hardware augmentation operations to simulate image degradations caused by particular camera devices. In one embodiment, the image augmentation engine 104 applies a wide angle lens augmentation operation to generate lens distortion augmentation images 405 with heavy distortion at the edges of the image plane simulating images captured by a fish eye lens or other wide angle lens.

Other image augmentations that may be performed by the image augmentation engine 104 include special transformations (e.g., rotation, translation, cropping, and scaling) and chromatic transformations (e.g., color, contrast, brightness). Image augmentation operations performed by the image augmentation engine 104 to generated augmented images may be executed on a GPU or other specialized image processor. In one embodiment, the image augmentation engine 104 performs the same image augmentations on every synthetic image and/or stereo image pair included in a synthetic image training set. The image augmentation engine 104 performs different image augmentations on synthetic images included in a synthetic image training set.

In one embodiment, the image augmentation engine 104 specifies a range of augmentation values for each augmentation operation then determines the augmentation to apply to each raw synthetic image 401 by sampling values within the range. For example, the image augmentation engine 104 may provide a range for a transformation augmentation operation between −20% and 20% of the image width for x and y, a range for a rotation augmentation operation from −17° to 17°, a range for a scaling rotation augmentation operation between 0.9 and 2.0, a range for a contrast augmentation operation from −0.8 to 0.4, and a range for multiplicative color changes to each RGB channel from 0.5 to 2. Values may be randomly, incrementally, or otherwise sampled from these ranges. The type of augmentation operation, the range of augmentation values for each operation, and augmentation value for each image may be defined in augmentation settings included in camera setting files.

Figure 10:
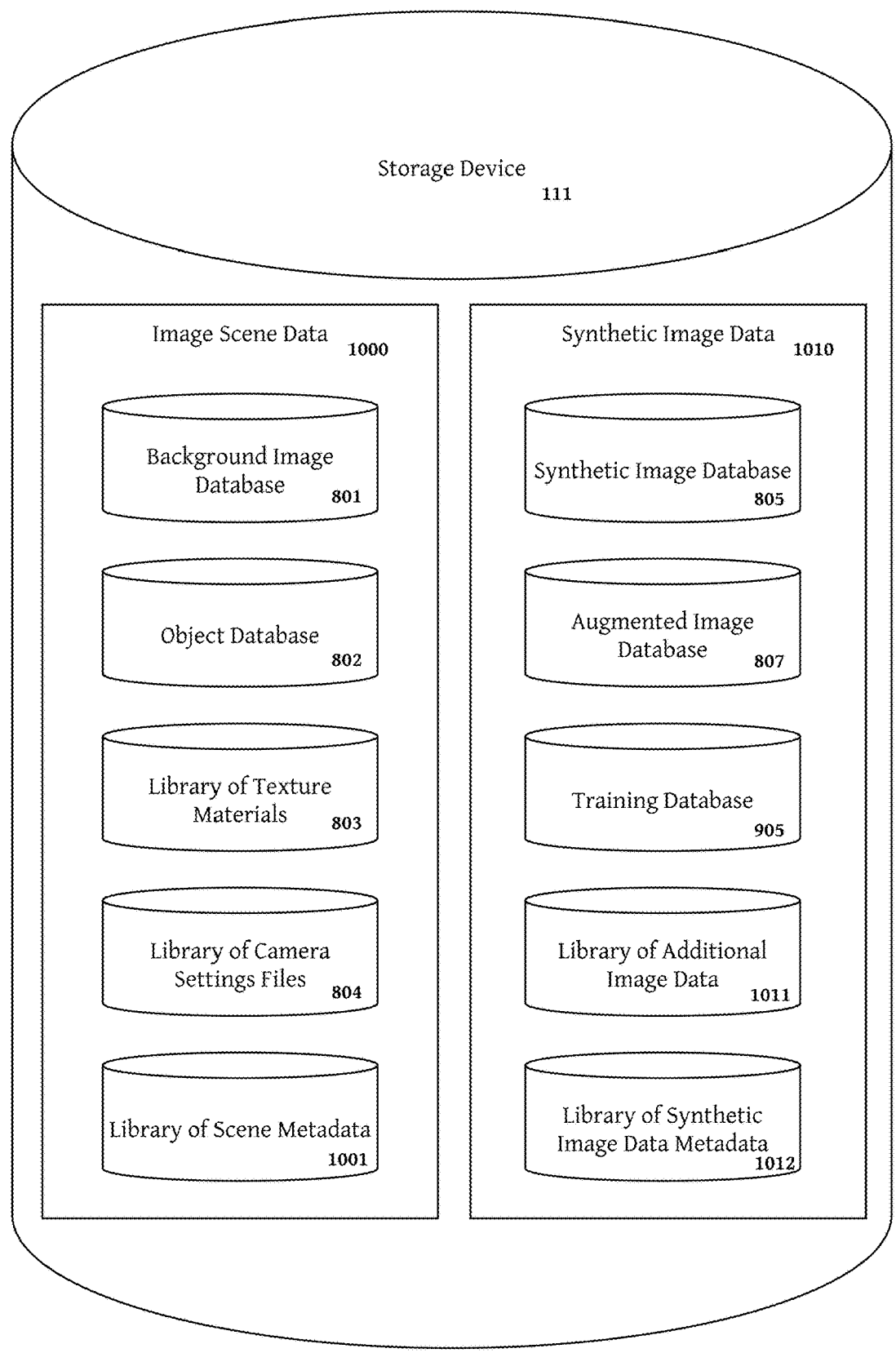
FIG. 10 is a block diagram representation of an example data storage architecture included in a storage device.

Augmented synthetic images generated by the synthetic image augmentation engine 104 may be written to memory 112 or otherwise stored in one or more databases, dataframes, libraries, repositories, image files, and/or other data stores included in a storage device 111. FIG. 10 illustrates one data storage architecture embodiment for persisting synthetic image data 1010 in a storage device 111. As shown in the figure, the data storage architecture may also include image scene data 1000 such as scene elements, camera files, and scene metadata including scene characteristics and scene assembly files describing how to arrange scene elements to construct an image scene. In one embodiment, image scene data 1000 is stored in a background image database 801, an object database 802, a library of texture materials 803, a library of camera settings files 804, and a library of scene metadata 1001. Synthetic image data 1010 within the storage device 111 is persisted in a synthetic image database 805, an augmented image database 807, a training database 905, a library of additional image data 1011, and a library of synthetic image data metadata 1012.

In one embodiment, the background image database 801 includes background images used to fill a background portion of an image scene. The background image database 801 may be organized as relational database or a list of compressed and/or uncompressed background image files (e.g., .png, .jpeg, etc.) indexed by filing name and/or image attributes (e.g., image type, creation date, image size, etc.). In other examples, the background image database 801 may be a set of folders with each folder including background images having a specific file name and/or image attributes as well as a metadata file (e.g., .JSON .XML, or other markup language file) describing the images included in the folder.

Background images included in the background image database 801 may be virtual or real world images depicting cityscapes, landscapes, out of focus scenes, or other image types. Background images also include solid color hues, color gradients, patterns, or other textures. In one embodiment, the background image database 801 includes 3D background images generated by combining an image file (e.g., a background image file of a real world landscape image) with a depth map comprising depth information for every point included in the image file. A graphics rendering engine renders a 3D background image by combining the image file with the depth map, wherein every point included in the image file is rendered using a corresponding depth value included in the depth map. The background image database 801 may also include synthetic background images generated by populating a background image file with one or more objects (e.g., 3D objects and/or 2D objects).

In one embodiment, the background image database 801 may include a background image training database and a background image verification database. The background image training database may include a subset of background images available for placement in image scenes used to generate synthetic image data used in training a machine learning system. The background image verification database may include a subset of background images excluded from the background image training database, wherein the subset of background images in the background image verification database are placed in image scenes used to generate synthetic image data used in validating a machine learning model produced by a machine learning system trained on synthetic images generated from image scenes produced using background images included in the background image training database.

The object database 802 stores objects incorporated into image scenes including 3D models and light sources. The object database 802 may be organized as a relational database or a list of object files including computer assisted design (CAD) file formats (e.g., .dwg, .dxf, .dgn, and .stl) and object file formats (e.g., .obj). In other examples, the object database 802 may be a set of folders with each folder including objects having a specific name, object type (e.g., 2D model, 3D model, or light source), or object attributes (e.g., object dimensionality, object size, creation date, etc.) as well as a metadata file (e.g., .JSON, .XML, or other markup language file) describing the objects included in the folder.

In one embodiment, 3D models included in an object database 802 are three dimensional polygon mesh structures having variable dimensionality (i.e., the number of polygons included in the polygon mesh). 3D models may be common geometric shapes and/or 3D renderings having the shape and dimensions of real world objects. New 3D models may also be added to the object database 802 by scanning a real world object with a 3D scanning device or illustrating an object of interested using a CAD software program. Dimensionality of 3D models included in the object database 802 is typically between 10,000 and 500,000 polygons. One or more light sources may also be stored in the object database 802. Light sources illuminate image scenes to provide light captured by a virtual camera during synthetic image generation. In one embodiment, light sources may include spotlights, diffuse lights, low light, mirrors, reflective surfaces, flat surfaces, and featureless surfaces. Depending on the relative position between light sources and virtual cameras, synthetic images may include one or more light based image degradations (e.g., a lens flare, glare, poor contrast, or over saturation effect).

In one embodiment, the object database 802 may include an object training database and an object verification database. The object training database may include a subset of objects including 2D/3D models and light sources available for placement in image scenes used to generate synthetic image data used in training a machine learning system. The object verification database may include a subset of objects excluded from the object training database, wherein the subset of objects in the object verification database are placed in image scenes used to generate synthetic image data used in validating a machine learning model produced by a machine learning system trained on synthetic images generated from image scenes produced using objects included in the object training database.

In one embodiment, 3D models included in the object database 802 are greyscale polygon mesh structures that persist a three dimensional shape of an object without incorporating color or other appearance information. Therefore, to generate a realistic 3D object, a graphics rendering engine may select a texture file corresponding to a 3D object from the library of texture materials 803 and cover the 3D object polygon mesh structure with the texture material. To render a 3D object wrapped in a texture material, the graphics rendering engine may identify one or more attachment points on the 3D mesh structure for fixing the texture file to the 3D model. In one embodiment, the one or more attachment points are mapped to one or more areas of the texture file to ensure the correct portion of the texture file covers each section of the 3D mesh structure.

The library of texture materials 803 may be organized as a relational database or a list of texture source file formats (e.g., .exr, .psd, or .tif), texture preview file formats (e.g., .bmp, .gif, .jpg, .png, .tga, or .tif), and/or texture runtime file formats (e.g., .3dc, .dds, .dxt, .pvr, .s3tc, .tpl, or .vft). In other examples, the library of texture materials 803 may be a set of folders with each folder including texture files having a specific name, texture type (e.g., pattern, color, image or object exterior), or texture attributes (e.g., texture file type, texture size, creation date, etc.) as well as a metadata file (e.g., .JSON, .XML, or other markup language file) describing the textures included in the folder.

In one embodiment, the library of texture materials 803 may include a library of training textures and a library of verification textures. The library of training textures may include a subset of texture files available for covering objects placed in image scenes used to generate synthetic image data used in training a machine learning system. The library of verification textures may include a subset of texture files excluded from the library of training textures, wherein the subset of texture files in the library of verification textures cover objects placed in image scenes used to generate synthetic image data used in validating a machine learning model produced by a machine learning system trained on synthetic images generated from image scenes produced using texture files included in the library of training textures. In one embodiment, the library of training textures includes all texture files corresponding to objects included in the object training database. The library of training textures may also include all texture files corresponding to objects included in the object verification database.

Figure 5:
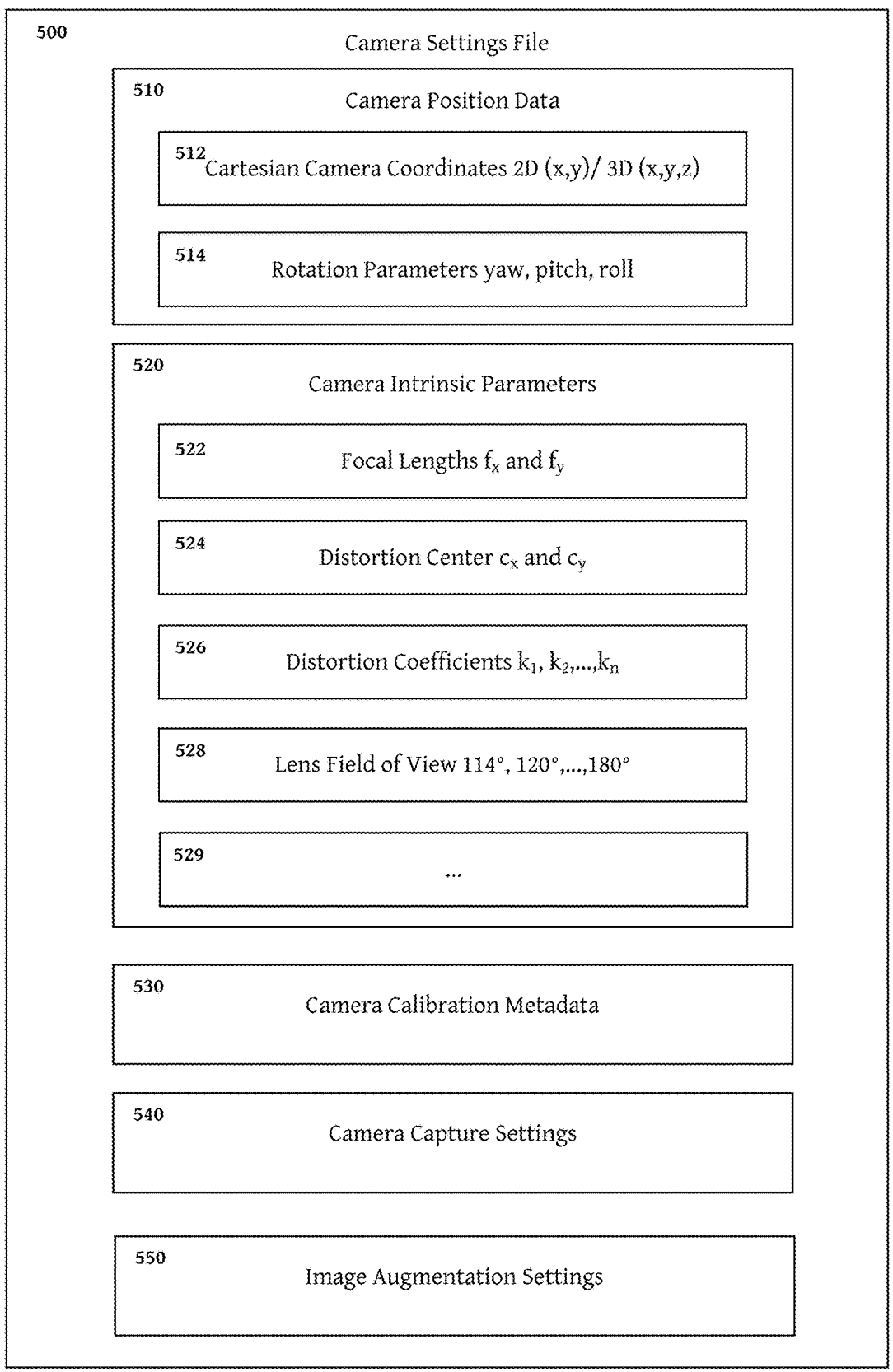
FIG. 5 is a block diagram illustrating an example camera setting file with camera position data and camera intrinsic parameters shown in detail.
Figure 6:
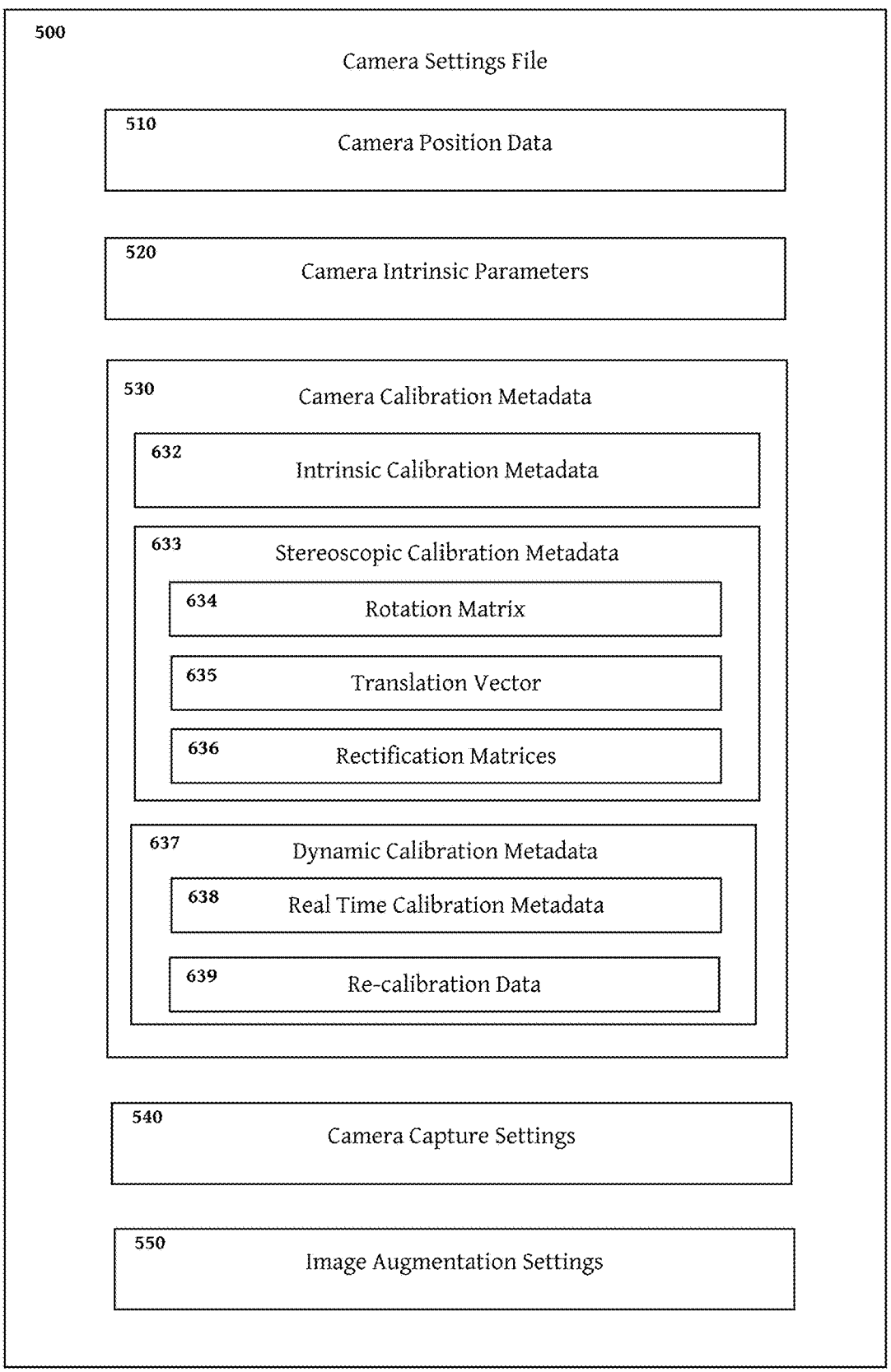
FIG. 6 is a block diagram illustrating an example camera setting file with camera calibration metadata shown in detail.
Figure 7:
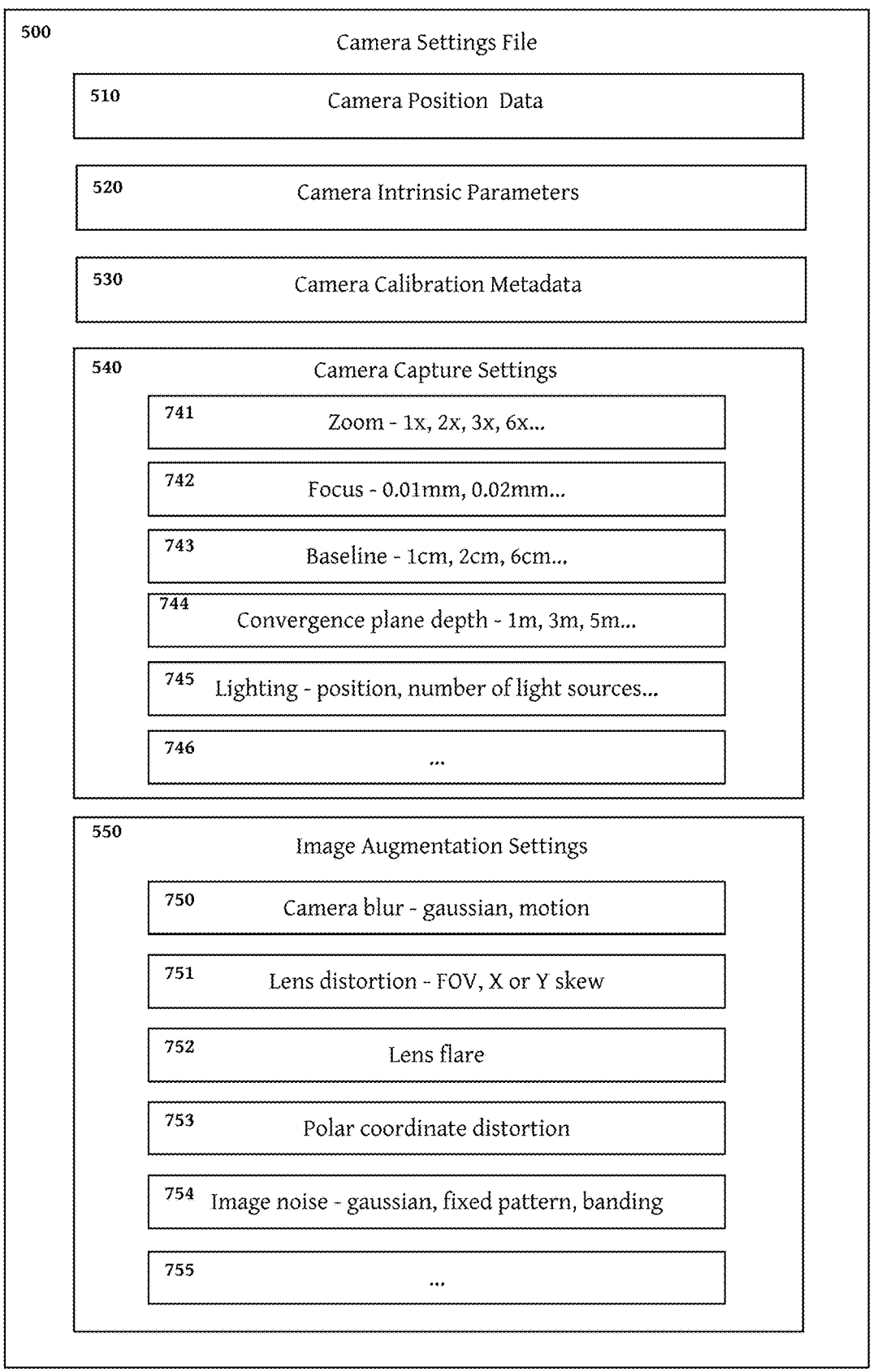
FIG. 7 is a block diagram illustrating an example camera setting file, wherein camera capture settings and image augmentation settings shown in detail.

The library of camera settings files 804 includes camera settings files as shown in FIGS. 5-7 below. Camera settings files describe the position, internal parameters, calibration parameters, and camera capture settings of virtual cameras included in an image scene. To simulate performance of actual camera devices, content of the camera settings files may be identical to actual camera devices available in the marketplace (e.g., smartphone cameras, stereo cameras, light field cameras, etc.). The library of camera settings files 804 may be organized as a relational database or a list of camera settings files. In other examples, the library of camera settings files 804 may be a set of folders with each folder including camera settings files having a specific name, camera device type (e.g., smartphone, camera, stereo camera, light field camera, etc.), or camera settings file attributes (e.g., number of camera settings, file size, creation date, etc.) as well as a metadata file (e.g., .JSON, .XML, or other markup language file) describing the camera device files included in the folder.

The library of scene metadata 1001 includes scene metadata files describing an image scene class indicating the subject matter, complexity, composition, and/or overall appearance of an image scene. Scene metadata files also include scene selection algorithms, scene assembly algorithms, composition information, and assembly parameters for synthetic image scenes generated by the synthetic image device. Scene composition information included in scene metadata files may specify: a background image and/or category of background images included in the background image database 801 to select for a scene background image. Scene metadata files may also define the number of objects to place in a scene and/or list specific objects files or object types to incorporate in a scene. A texture file and/or category of texture files for covering each object in a scene may also be specified in scene metadata files. Scene assembly instructions may also be included in scene metadata files. In one embodiment, scene assembly instructions describe the dimensions of a scene, the location of background image(s) and objects within a scene, and additional scene construction rules and/or instructions for creating an image scene having a scene class (e.g., cityscape scene, landscape scene, selfie scene, portrait, wildlife scene, event scene, still life scene, night scene, aerial scene, underwater scene, action scene (i.e., scenes including animations moving one or more objects), street view scenes, driver point of view scenes, noisy scenes, distorted or degraded scenes, standard field of view scenes, wide filed of view scenes, and ultra wide field of view scenes). Scene metadata may also include a 3D model selection routine and a 3D model arrangement routine as described above, wherein the 3D model selection routine determines objects to include in an image scene and the 3D model arrangement routine determines the position and depth of objects included in the image scene.

Scene assembly instructions may also include animations to apply to one or more objects included within a scene. Animations included in scene metadata files may describe how to move one or more objects in realistic ways to generate image scenes with moving objects. Animations may be applied to 2D and/or 3D objects included in an image scene as well as background images. In addition to moving objects, animations may also periodically change one or more objects and/or background images for a substitute object and/or background image. The synthetic image generation system may use animated image scenes to generate synthetic images incorporating moving objects and augmented synthetic images including degradations caused by object movement. Using animated image scenes, the synthetic image generation system may also simulate performance of actual camera devices while capturing moving objects and generate optical flow information (i.e., object direction and velocity) for objects included in image scenes.

The library of scene metadata 1001 may be organized as a relational database or a list of scene metadata files. In other examples, the library of scene metadata 1001 may be a set of folders with each folder including scene metadata files having a specific name, scene class (e.g., landscape scene, selfie scene, still life scene, action scene, etc.), or image scene attributes (e.g., number of objects, included animations, file size, creation date, etc.) as well as a metadata file (e.g., .JSON, .XML, or other markup language file) describing the scene metadata files included in the folder.

The data storage architecture of the storage device 111 may also include synthetic image data 1010 stored in a synthetic image database 805, augmented image database 807, training database 905, library of additional image data 1011, and library of synthetic image data metadata 1012. In one embodiment, the synthetic image database 805 includes synthetic images captured from image scenes generated using image scene data 1000. Synthetic images provided by the virtual camera application 122 are stored in the synthetic image database. The synthetic image database 805 may be organized as a relational database or a list of synthetic images. In other examples, the synthetic image database 805 may be a set of folders with each folder including synthetic image files having a specific name, scene metadata, scene class (e.g., landscape scene, selfie scene, still life scene, action scene, etc.), capturing camera device, or image attributes (e.g., number of objects, file size, creation date, etc.) as well as a metadata file (e.g., .JSON, .XML, or other markup language file) describing the synthetic image files included in the folder.

In one embodiment, the augmented image database 807 includes synthetic images augmented by one or more image degradations and/or effects. Synthetic images generated by the image augmentation engine 106 are stored in the augmented image database 807. The augmented image database 807 may be organized as a relational database or a list of synthetic images. In other examples, the augmented image database 807 may be a set of folders with each folder including synthetic image files having a specific name, image augmentation (e.g., edge detection, polar distortion, lens flare, lens distortion, noise augmentation, motion blur, Gaussian blur, bokeh, etc.), scene metadata, capturing camera device, or image attributes (e.g., number of objects, number of augmentations, file size, creation date, etc.) as well as a metadata file (e.g., .JSON, .XML, or other markup language file) describing the synthetic image files included in the folder.

In one embodiment, the library of additional image data 1011 includes additional image data (i.e., synthetic image data other than synthetic images) rendered from virtual camera positions defined in camera settings files. Additional image data may be rendered at the same camera position and direction as synthetic images. In these embodiments, additional image data files rendered at the same camera view as a synthetic image are associated (e.g., labeled or tagged as children) with the parent synthetic image. Additional image data generated by the additional image data rendering unit 106 may include depth information (e.g., depth maps), image segmentation data (e.g., image segmentation maps), optical flow information (e.g., object direction, object velocity, etc.), facial recognition data (e.g., face ID features and/or models), and noise data (e.g., noise maps, occlusion maps, etc.). The library of additional image data 1011 may be organized as a relational database or a list of synthetic image data files. In other examples, the library of additional image data 1011 may be a set of folders with each folder including additional image data files having a specific name, additional image data type (e.g., depth, image segmentation, optical flow, facial recognition data, noise data, etc.) scene metadata, capturing camera device, or additional image data attributes (e.g., number of objects, parent synthetic image, file size, creation date, etc.) as well as a metadata file (e.g., .JSON, .XML, or other markup language file) describing the additional image data files included in the folder.

Subsets of synthetic image data 1010 (e.g., synthetic images, augmented images, and additional image data channels) may be assembled into training datasets stored in a training database 905. In one embodiment, training datasets include synthetic image data optimized for training a machine learning system to perform a computer vision task (e.g., depth data generation, image segmentation, feature tracking, object tracking, facial recognition, image classification, or object classification). Training datasets used to train models performing a particular computer vision task include synthetic images generated from a common image scene class (e.g., cityscape scene, landscape scene, selfie scene, portrait, wildlife scene, event scene, still life scene, night scene, aerial scene, underwater scene, action scene (i.e., scenes including animations moving one or more objects), street view scenes, driver point of view scenes, noisy scenes, distorted or degraded scenes, standard field of view scenes, wide filed of view scenes, and ultra wide field of view scenes). Training dataset including synthetic images having a common image scene class are generated by constructing one or more image scenes of the desired image scene class by executing scene component selection algorithm and a scene assembly algorithm, wherein the scene component selection algorithm selects background images, objects, and texture materials included in image scenes of the image scene class and the scene assembly algorithm assembles scene components into an image scene having similar appearance and complexity to image scenes of the image scene class.

The training database 905 may be organized as a relational database or a list of training datasets. In other examples, the training database 905 may be a set of folders with each folder including a training dataset having a specific name, composition of image data (e.g., synthetic images, augmented images, and/or additional image data), computer vision application, scene metadata, capturing camera device, or training dataset attributes (e.g., number of synthetic image data files, file size, creation date, etc.) as well as a metadata file (e.g., .JSON, .XML, or other markup language file) describing the training dataset included in the folder.

Training datasets may be assembled using a search platform that locates synthetic image data using one or more metadata fields. Metadata fields for synthetic image data files may be included in the library of synthetic image metadata 1012. In one embodiment, each synthetic image data file has a unique metadata file (e.g., .JSON, .XML, or other markup language file) including a file name, synthetic image data type, file name of the parent synthetic image, list of any other image data files generated from the same camera view as the parent synthetic image, size of the image file, creation date, camera device used to capture the camera view, values for one or more parameters included in the camera settings file for the camera device, scene metadata for generating the parent image, and/or applicable computer vision applications.

Databases and other collections of synthetic image data written to memory and/or stored in a storage device 111 may be indexed, organized, tagged, cleaned, modified, associated with parent synthetic images, or otherwise processed by the image indexing module 108. The training data assembly service 103 may search for and collect augmented synthetic images from one or more databases or other datastores included in a storage device 111 using one or more metadata indices provided by the image indexing module 108. The training data assembly service 103 may then transfer collections of augmented images, synthetic images, and additional image data files to the machine learning service 105 as training datasets for processing by one or more machine learning systems.

Assembling Training Data from Synthetic Images

Training datasets including collections of synthetic image data generated by the synthetic image generation system 100 are stored in a training database 905. The training database 905 may also include synthetic image data metadata describing characteristics of synthetic images and additional image data channels as well as scene metadata describing attributes of image scenes captured in synthetic images and additional image data channels. To generate machine learning models for performing CV tasks, training datasets are extracted from the training database 905 and processed by machine learning systems. In one embodiment, the synthetic image generation system 100 includes a training data pipeline 120 to ensure efficient compilation of synthetic images and additional image data channels into training datasets and rapid processing of training data by machine learning systems. In one embodiment, the training data pipeline 120 includes an image indexing module 108, a training data assembly service 103, and a machine learning service 105. The training data pipeline 120 organizes synthetic images and additional image data channels provided by the synthetic image generation system 100, complies specific selections of synthetic images and additional image data into training datasets generated for specific CV applications, and provides the training data to machine learning systems for further processing.

The image indexing module 108 can be software including routines for tagging and indexing synthetic image data by metadata fields. In some embodiments, the image indexing module 108 can be a set of instructions executable by the processor 113 to provide the functionality described below for indexing synthetic images provided by the synthetic image generation module 102, augmented images provided by the image augmentation engine 104, and additional image data channels provided by the AIDRU 106 on metadata fields describing characteristics of synthetic image data. In some embodiments, the image indexing module 108 can be stored in the memory 112 of the image computing device 100 and can be accessible and executable by the processor 113. The image indexing module 108 may be adapted for cooperation and communication with the processor 113 and other components of the image computing device 100 via an interconnect 115.

In one embodiment the image indexing module 108 may include a search platform implemented as a back end search implementation (e.g., Elasticsearch or Solr) leveraging a full text index of file names, synthetic image metadata, and scene metadata. The search platform may provide a full text index and search for every datastore included in the storage architecture illustrated in FIG. 10. Particularly, the image indexing module may enable full text search of text data included in a background image database 801, object database 802, library of texture materials 803, library of camera settings files 804, library of scene metadata 1001, synthetic image database, augmented image database 807, training database 905, library of additional image data 1011, and library of synthetic image data metadata 1012. Training datasets including single images, stereo image pairs, augmented images, depth maps, disparity maps, segmentation maps, optical flow maps, occlusion maps, noise maps, and facial recognition features/models may be assembled using the search platform included in the image indexing module 108.

In some embodiments, the search platform included in the image indexing module 108 may implement an analytics module for efficiently sorting and locating patterns of synthetic images and additional image data channels having specific index values. The search platform may be exposed in a user interface 109 as a natural language based search engine that returns listings of synthetic image and additional image data files in response to queries entered in a search bar. The search platform may use keyword or exact match methods to return synthetic image data files, scene files, synthetic image data metadata, and scene metadata. Additionally, the search platform may also incorporate a relevance rating or use one or more machine learned search techniques to augment keyword or exact matches with similar and/or likely relevant results.

In some embodiments, the image indexing module 108 may index images on metadata fields encoded into the synthetic image at capture by the synthetic image generation module 102. The metadata fields include date and time a image was generated, size of an image file, image scene class (e.g., cityscape, landscape, road view, face, building interior, outdoor scene, random object compilation, etc.), image classification (e.g., stereo image, complex image, low light image, etc.), scene metadata (e.g., type of background image, type and number of textures, type and/or number of virtual cameras in a scene, type and/or number of objects in a scene, scene construction method, scene depth, etc.), number and type of additional image data channels generated from the parent synthetic image, additional image data associated with a synthetic image, camera settings file used to capture an image, one or more parameters included in a camera settings file used to capture an image, image metadata (e.g., type and/or number objects included in an image, depth of background image, depth of a foreground object, maximum depth of a foreground object, number and type image augmentations performed on a parent synthetic image, additional image data rendered for a camera view captured in a parent synthetic image, etc.), intended cv application(s) for image, camera device (e.g., smartphone camera model or camera device model) simulated in a synthetic image, and/or camera device simulated by the selected camera settings file.

The image indexing module 108 may also apply one or more tags to synthetic images and additional image data. Tags applied by the image indexing module may include the amount and type of foreground objects captured in an image, a scene class (e.g., cityscape, landscape, road view, face, building interior, outdoor scene, random object compilation, etc.), image complexity, the existence and type of additional image data generated for the synthetic image, and one or more CV applications the synthetic images and/or additional image data could be used to perform. Post tagging, the synthetic images and image data channels are indexed on the applied tags to provide more descriptive indices for efficient and precise assembly of particular datasets. Indices generated by the image indexing module 108 are used by the training data assembly service 103 during image dataset compilation. Indexing and/or search functions performed by the image indexing module 108 may be performed automatically on a periodic, recurring, and/or scheduled basis as chronological jobs.

The training data assembly service 103 can be software including routines for compiling training datasets including synthetic images, augmented images, additional image data channels, scene metadata, and image metadata. In some embodiments, the training data assembly service 103 can be a set of instructions executable by the processor 113 to provide the functionality described below for compiling training datasets for particular CV applications using the search functionality provided by the image indexing module 108. In some embodiments, the training data assembly service 103 can be stored in the memory 112 of the image computing device 100 and can be accessible and executable by the processor 113. The training data assembly service 103 may be adapted for cooperation and communication with the processor 113 and other components of the image computing device 100 via an interconnect 115.

The training data assembly service 103 executes search functionally provided by the image indexing module 108 to prepare training datasets including synthetic images, augmented images, additional image data channels, scene metadata, and image metadata for further processing by machine learning systems. Training datasets produced by the training data assembly service are stored in the training database 905 included in the data storage architecture described above in FIG. 10. In one embodiment, the training data assembly service 103 compiles training datasets by selecting synthetic images, augmented images, and/or additional image data generated from image scenes having a specific scene metadata field. Training datasets may also be generated by the image indexing module 108 using image metadata indicating the synthetic image data is optimized for training a machine learning system to generate models accurately performing one or more CV tasks.

In one example, the training data assembly service 103 prepares training datasets by selecting synthetic images having a common scene class from a training database 905. Scene classes describe the subject matter and/or complexity of synthetic images to organize synthetic images into categories optimized for specific CV applications. In one embodiment, image scene classes (e.g., cityscape scene, landscape scene, selfie scene, portrait, wildlife scene, event scene, still life scene, night scene, aerial scene, underwater scene, action scene (i.e., scenes including animations moving one or more objects), street view scenes, driver point of view scenes, noisy scenes, distorted or degraded scenes, standard field of view scenes, wide filed of view scenes, and ultra wide field of view scenes).

By executing search functionality provided by the image indexing model 108, the training data assembly service 103 may assembly CV application specific training datasets comprising synthetic images, augmented images, additional image data channels, scene metadata, and/or image data metadata. In one embodiment, the training data assembly service 103 compiles a training dataset for training a machine learning system to perform facial recognition tasks. To generate the facial recognition specific training dataset, the training data assembly service 103 may select synthetic images, augmented synthetic images, and depth maps including one or more faces. Alternatively, to compile a training dataset for training machine learning system to track a soccer ball, the training data assembly service 103 may select synthetic images, edge detection augmented images, and optical flow maps including animated sports balls and other round spherical objects in motion.

The training data assembly service 103 may also compile training datasets in real time during model training according to feedback on training progress, data processing efficiency, and or model accuracy received from the machine learning service 105. In one embodiment, the machine learning service 105 indicates a training dataset having particular characteristics is rapidly increasing the accuracy of machine learning models for a particular CV application. In response, the training data assembly service 103 complies an expanded set of synthetic image, augmented images, additional image data channel files, scene metadata, and/or synthetic image metadata having a set of characteristics included in the original high performing dataset. After executing search functionality provided by the image indexing module 108 to compile the training dataset, the training data assembly service 103 provides the expanded dataset to the machine learning service 105 in real time for distribution to a machine learning system.

In other embodiments, the machine learning service 105 indicates a training dataset having particular characteristics failed to produce accurate machine learning models within a specific time period and/or a machine learning system is unable to process the training dataset in a reasonable time using available computational resources. In response, the training data assembly service 103 compiles a smaller and/or distinct training dataset including synthetic images, augmented images, additional image data files, scene metadata, and/or image data metadata having different characteristics. The machine learning service 105 then provides to new dataset in real time to a machine learning system and receives feedback on training using the new dataset. If the feedback is negative, the machine learning service 105 will fetch a new dataset having different characteristics from the training data assembly service 103 until providing an effective dataset iteration to the machine learning system.

The machine learning service 105 can be software including routines for sending and receiving data including training datasets and performance feedback to and from machine learning systems. In some embodiments, the machine learning service 105 can be a set of instructions executable by the processor 113 to provide the functionality described below for transmitting training datasets complied by the training data assembly service 103 to machine learning systems and relaying feedback including training performance and generated model accuracy between machine learning systems and the training data assembly service 103 for real time modification of training datasets. In some embodiments, the machine learning service 105 can be stored in the memory 112 of the image computing device 100 and can be accessible and executable by the processor 113. The machine learning service 105 may be adapted for cooperation and communication with the processor 113 and other components of the image computing device 100 via an interconnect 115.

In one embodiment, the machine learning service 105 communicates with machine learning systems outside the synthetic image generation system 101. In other examples, the machine learning service 105 includes one or more machine learning systems for generating one or more machine learning models for CV applications by processing training datasets compiled by the training data assembly service 103. Machine learning systems communicatively coupled to—and/or included in—the machine learning service 105 include rules based classification algorithms, neural networks, and deep learning methods. More specifically, Naïve Bayes classification algorithms, decision tree classification algorithms, convolutional neural networks (CNNs), convolutional recurrent neural networks (CRNNs), hierarchical recurrent convolutional neural networks (HRNN), and HRNNs with attention vectors implemented in a machine learning framework (e.g., Keras, Scikitlearn, MXNet, or Tensorflow). Machine learning models generated by one or more of these machine learning systems may perform CV tasks including depth generation, image segmentation, object tracking, facial recognition, object classification, gesture tracking and control, object counting, 2D to 3D conversions, 3D scanning, and SLAM.

The machine learning service 105 may modify training datasets provided by the training data assembly service 103 to optimize training data for processing by one or more machine learning systems. Modifications made by the machine learning service 105 may include cleaning operations, compression operations, buffering, encoding for streaming, and/or conversion to one or more file formats optimized for distribution and processing of image data (e.g., converting to a file format optimized for distribution over a content delivery network). To improve efficiency and reduce latency during transmission and/or pre-processing of synthetic image datasets, the machine learning service 105 may batch process and/or deliver batches of synthetic image and additional image data files.

Camera Tuning

By mirroring the camera capture settings, calibration parameters, and other characteristics of an actual camera device in a camera device file, the synthetic image generation system 101 may simulate the performance of actual camera devices during synthetic image generation. In one embodiment, the camera tuning service 107 synthesizes synthetic images generated using camera settings identical to an actual camera device to gain insight into performance of actual camera devices under a variety of capture conditions. Based on the synthesis of synthetic images, the camera tuning service 107 may generate tuning parameters describing one or more modifications to one or more camera settings that would improve performance of an actual camera device. The camera tuning service 107 may include a port, wireless connection terminal, or other interface for connecting to a camera device and communicating tuning parameters to the camera device in real time. Tuning parameters generated by the camera tuning service 107 may include current camera settings values, optimized camera setting values, and one or more confidence metric associated with the optimized camera settings values.

In one embodiment, the camera tuning service 107 retrieves current camera setting values from a connected camera device. The camera tuning service 107 then synthesizes synthetic images to generate tuning parameters including optimized values for one or more of the current camera settings retrieved from a connected camera device. The optimized values may be generated based on the performance of a virtual camera having the same settings as the connected camera during synthetic image capture. In one embodiment, to determine an optimal camera setting value, the camera tuning service 107 synthesizes a set of synthetic images captured using a range of camera setting values, wherein the synthetic images are captured using incrementally spaced camera setting values with each synthetic image having a unique camera setting value. If one or more optimized camera setting values generated by synthetic image synthesis has a confidence metric above a defined threshold, the camera tuning service 107 generates instructions for modifying the current camera capture settings with the optimized camera capture settings. Modification instructions may be generated for each camera setting, wherein the optimal value for the camera setting is associated with a confidence metric exceeding the threshold. To change one or more current camera settings to one or more optimized camera settings, modification instructions provided by the camera tuning service 107 are executed by a processor 113 included in the image computing device 100 and/or an external processor (e.g., a processor included in the camera device).

The camera tuning service 107 can be software including routines for optimizing one or more camera settings included in an actual camera device based on performance of one or more virtual cameras. In some embodiments, the camera tuning service 107 can be a set of instructions executable by a processor 113 to provide the functionality described below for generating tuning parameters including optimal camera setting values and instructions for changing one or more current camera setting values to one or more optimal camera setting values. In some embodiments, the camera tuning service 107 can be stored in the memory 112 of the image computing device 100 and can be accessible and executable by the processor 113. The camera tuning service 107 may be adapted for cooperation and communication with the processor 113 and other components of the image computing device 100 via an interconnect 115.

Camera Setting Files

To simulate the performance of an actual camera device the camera tuning service 107 uses one or more camera setting files having identical camera settings to actual camera devices. The synthetic image generation module 102 also uses camera setting files to define the image plane captured in a synthetic image. FIGS. 5-7 included below illustrate an example camera setting file 500 embodiment used by the synthetic image generation system. More particularly, FIG. 5 describes camera position data 510 and camera intrinsic 520 parameters, FIG. 6 describes camera calibration metadata 530, and FIG. 7 describes camera capture settings 540, and image augmentation settings 550.

As shown in FIG. 5, in one embodiment, a camera setting file 500 includes camera position data 510 describing the location of a virtual camera within a scene, camera intrinsic 520 parameters describing internal properties of a camera device, camera calibration metadata 530 including one or more parameters for calibrating one or more virtual camera modules, camera capture settings 540 for modifying a view perspective captured in a synthetic image, and image augmentation settings 550 for augmenting one or more synthetic images. Camera position data 510 may include Cartesian camera coordinates 512 describing the position of a virtual camera device within a scene provided by the synthetic image generation system 101. Cartesian coordinates camera 512 may include 2D Cartesian camera coordinates (i.e., x, y) describing a virtual camera position in a 2D scene and/or 3D Cartesian camera coordinates (i.e., x, y, z) describing a virtual camera position in a 3D scene. In one embodiment, 3D Cartesian camera coordinates are included in camera coordinates used to locate a virtual camera in a 3D scene during image projection. In one embodiment, Cartesian camera coordinates 512 may also include image coordinates describing the location of the image plane of a virtual camera in a 2D projection of a 3D scene. An image projector creates a 2D projection of a 3D scene by slicing a 2D section of the 3D scene at an image plane location defined in the camera settings file 500. The image projector then uses the image coordinates to define, within the 2D projection, the location of the virtual camera image plane including the camera view of the image scene captured by the virtual camera. Therefore, the image coordinates describe an image plane location including a camera view of a synthetic image scene, wherein the camera view is defined by camera position data, camera intrinsics, camera calibration metadata, and/or camera capture settings.

Camera position data 510 may also include rotation parameters 514 describing the angular orientation of a virtual camera in a 2D/3D scene. The rotation parameters 514 may include Euler angles (i.e., pitch, yaw, and roll). In scenes with only one virtual camera, Euler angles define the rotational offset angles between the geometric coordinate system of the synthetic image scene and the image plane of the virtual camera. In scenes include two or more virtual cameras having a stereoscopic orientation, Euler angles may also define the rotational offset angles between the coordinate systems of the left and right stereo camera modules. Euler angles defining the rotational offset between to stereo camera modules may be used to generate the elemental rotation matrices used to perform stereo calibration. In scenes including two or more virtual camera modules in a stereoscopic arrangement, the rotation parameters may include two or more sets of Euler angles. A first set of Euler angles defining the rotational offset between a virtual camera module and the scene geometric coordinate systems and a second set of Euler angles defining the rotational offset between the left and right stereo camera modules.

Camera intrinsic 520 parameters describe the internal properties of a camera device. In one embodiment, camera intrinsic parameters 520 include focal lengths 522 ($f_x$, $f_y$), distortion center 524 ($c_x$, $c_y$), distortion coefficients 526 ($k_1$, $k_2$, ..., $k_n$), lens field of view 528 (e.g., 80°, 114°, 120°, ..., 180°), and other internal properties of the camera lens, image sensor, or other camera component. Camera intrinsic parameters 520 included in the camera settings file 500 may be identical to camera intrinsic parameters of actual camera devices. Camera intrinsic parameters 520 are specific to each camera device and must be precisely defined for accurate calibration. Even two of the same model camera devices may have different intrinsic parameters 520 due to manufacturing differences. The camera intrinsic parameters 520 described in more detail below are unique for each virtual camera included in a scene and help define the image plane captured by a virtual camera. To rapidly iterate between simulating capture performance of different actual camera devices, the camera intrinsic parameters 520 included in a camera settings file 500 may be changed in real time. To optimize camera calibration, current values of one or more camera intrinsic parameters may also be changed to optimal values by the camera tuning service 107.

Focal lengths 522 included in the camera settings file 500 may be $f_x$ and $f_y$ parameters describing focal lengths of the lens in the x and y directions that are perpendicular to each other. The focal lengths are the distances over which initially collimated light rays are brought to a focus, and measures how strongly the lens converges or diverges lights. A lens with a shorter focal length can bend the light rays more sharply. Lenses that are not perfectly circular, for example, some fisheye lenses, may distort or bend the light in slightly different ways in the x direction versus the y direction. Thus, the focal length at the x direction $f_x$ can be different from the focal length at the y direction $f_y$ for aspheric and other asymmetrically curved lenses.

Distortion centers 524 included in camera settings files 500 for virtual cameras may be $c_x$ and $c_y$ parameters describing the distortion center of projection in the image frame captured by the lens. Since actual camera devices modeled by one or more camera settings files may have different lens shapes, the distortion center denoted by $c_x$ and $c_y$ may not be positioned at the geometric center of the image frame. Irregular shaped lenses including aspheric and fisheye lenses do not have prefect circular symmetry, therefore the distortion centers 524 included in camera settings files 500 for virtual cameras setup with irregular shaped lenses are not a the geometric center of the image frame.

Distortion coefficients 526 included in camera settings files 500 for virtual cameras may be $k_1, k_2, \ldots, k_n$ parameters describing the levels of lens distortion, as a function of the radius from the center of the captured image frame to the edge of the frame. In some embodiments, n can be, for example, between 1 and 16, depending on how precise the calibration needs to be and the characteristics of the particular lens. The distortion coefficients 526 describe how much distortion an image pixel has as a location of the pixel moves from the center of the image to the edge of the image. In some embodiments, the $k_1, k_2, \ldots, k_n$ parameters are defined radially and do not depend on the circular angle of the pixel location. The distortion coefficients 526 are variable depending on the type of lenses used in the camera module. For example, different polynomial lens distortion models having different numbers of distortion coefficients 526 with different values and orders of magnitude are used to describe distortion levels for fisheye and non-fisheye lenses.

Additional camera intrinsic parameters 520 included in camera setting files 500 for virtual cameras may be lens field of view 528 (e.g., 80°, 114°, 120°, ..., 180°). Lens field of view 528 describes the viewing angle of a camera device with the degree value describing the size of the lens opening for receiving light. The lens field of view 528 is directly related to the shape of a lens therefore the distortion coefficients 526 and lens field of view 528 are interdependent. During camera calibration, the camera intrinsic parameters 520 allow a mapping between camera coordinates and pixel coordinates in the image frame. To calibrate a virtual camera module, intrinsic parameters 520 included in the camera setting files are organized in an intrinsic calibration matrix used to transform between projection coordinates in a camera frame and pixels in an image frame. The intrinsic calibration matrix may be stored in camera calibration metadata 530 included in a camera setting file 500 for a virtual camera as intrinsic calibration metadata 632.

FIG. 6 describes camera calibration metadata 530 included in a camera file 500 for a virtual camera device. For scenes including one virtual camera, camera calibration metadata 530 describes a calibration position for the virtual camera. In scenes including two or more virtual cameras arranged in a stereoscopic arrangement, camera calibration metadata 530 describes a calibration position for each virtual camera plus a calibration position for a stereoscopic dual camera device including two or more virtual cameras. In one embodiment, camera calibration metadata 530 includes intrinsic calibration metadata 632, stereoscopic calibration metadata 633, and dynamic calibration metadata 637. To accurately simulate performance of an actual camera device, the intrinsic calibration metadata 632 for a virtual camera may be generated using camera intrinsic parameters identical to camera intrinsic parameters of an actual camera device. For scenes having two or more virtual camera devices in a stereoscopic arrangement, stereoscopic calibration metadata 633 defines a calibration position wherein each stereoscopic virtual camera device captures the scene from the same image plane. Dynamic calibration metadata 637 includes calibration parameters for real time virtual camera calibration and re-calibration parameters for correcting calibration errors.

Stereoscopic calibration metadata 633 describes the relative position between two stereo camera modules and includes a mapping of coordinates between the right and left image channels. From a set of coordinate points describing the relative positions of two camera rectification matrices 636 and an optical distortion relationship for two stereo camera modules can be determined. The distortion relationship is used to correct lens distortion and the rectification matrices 636 are used to rectify the right and left image planes of virtual stereo cameras onto the same image plane.

Ideally, the two lenses of a stereo camera are perfectly aligned next to each other. However, in an actual dual camera device, any of the lenses may be off-center from a perfectly aligned position or rotated away from a perfectly aligned orientation. Rectification matrices 636 included in the stereoscopic calibration metadata 633 describe how to rectify captured synthetic images on the same image plane by offsetting the distortion caused by imperfect alignment between the virtual dual camera two lenses. In one embodiment, the rectification matrices 636 and distortion model described by distortion coefficients 526 included in the intrinsic calibration metadata 632 are applied to every pixel included in a pair of captured stereo synthetic images to make the synthetic images captured by two virtual stereoscopic virtual camera devices appear perfectly aligned as if they were captured from the same image plane. The correction described by the rectification matrices 636 improves the stereo 3D effect since human eyes are very sensitive to the distortion differences between left and right channels.

In one embodiment, stereoscopic calibration metadata 633 includes a rotation matrix 634, a translation vector 635, and rectification matrices. Rectification matrices 636 are generated using the rotation matrix 634 and translation vector 635, wherein the rotation matrix 634 describes a rotational correction aligning images captured by a virtual stereo camera device so that the image planes of the left and right image channels are on the same plane. A translation vector 635 describes a projection operation vertically aligning the image frames from the left and right channels. To achieve perfect alignment for stereo vision, the translational (i.e. vertical) alignment described by the translation vector 635 and the rotational alignment provided by the rotation matrix 634 are combined in the rectification matrices 636 applied to each image pixel during rectification. A left rectification matrix describes how to align the left image channel for stereo vision and a right rectification matrix describes how to align the right image channel for stereo vision.

In some embodiments, alignment of the virtual stereo camera modules may shift, for example, one virtual camera may be stacked on top of a second virtual camera to align on the virtual stereo cameras on the same vertical plane instead of on the same horizontal plane in a side by side arrangement. The translation vector 635 for calibrating stereo cameras having this orientation may describe a projection operation that ensures the image frames from the left and right channels are horizontally aligned. Additionally, the set of stereoscopic calibration metadata 633 can include other compensation metadata that relates to image sensors. For example, the virtual image sensor of the left channel may have slightly different color balance than the virtual image sensor of the right channel. Based on a color calibration test, the camera file 500 can store color-mapping metadata as portion of the stereoscopic calibration metadata 633 to equalize the color balance between the right and left image sensors to provide a uniform color profile.

In some embodiments, camera calibration metadata 530 also includes dynamic calibration metadata 637. Unlike conventional camera devices, calibration in virtual camera models described herein is not a static process. Instead, calibration may be dynamic and evolves based on performance of a virtual camera module under certain capture conditions. In one embodiment, dynamic calibration metadata 637 includes real time calibration metadata 638 and re-calibration data 639 generated by the synthetic image generation module 102. Real time calibration metadata 638 comprises calibration parameters for non-integer and uncalibrated camera settings. Re-calibration data 639 includes pixel position coordinates correcting calibration errors when applied to image pixel data during the process of mapping image pixels to display pixels. Re-calibration data 639 further includes re-calibration parameters describing a stereoscopic calibration position without calibration errors.

FIG. 7 describes camera capture settings 540 and augmentation settings 550 included in a camera file 500 for a virtual camera device. For scenes including one virtual camera, camera capture settings 540 include parameters defining a virtual camera setup used to generate a synthetic image. In one embodiment, camera capture settings 540 include a zoom setting 741, focus setting 742, baseline setting 743, convergence plane depth setting 744, lighting 745, and other parameters describing component positioning within a virtual camera, relative positioning between two or more virtual cameras, and capture conditions included in a scene. To accurately simulate performance of an actual camera device, the camera capture settings 540 for a virtual camera may be selected from a range of capture setting values included in an actual camera device. In one embodiment, augmentation settings 550 include parameters describing one or more image degradations, camera blur 750, lens distortion 751, lens flare 752, polar coordinate distortion 753, image noise 754, and other effects 755. To accurately simulate performance of an actual camera device, augmentation settings 550 may provide realistic image degradations for specific scene perspectives under certain capture conditions.

Camera capture settings 540 augment camera position data 510, camera intrinsic parameters 520, and calibration settings 530 by refining the perspective of a virtual camera within a set image plane. In other words, camera position data 510, camera intrinsic parameters 520, and calibration settings 530 define the image plane of a virtual camera within a scene, while the camera capture settings 540 determine how the set image plane is captured in a synthetic image. Camera settings including a zoom setting 741 (e.g., 1×, 2, 3×, 6×, etc.) and focus setting 742 (e.g., 0.01 mm, 0.02 mm, etc.) can significantly influence the appearance of synthetic images. In dual camera systems, a baseline setting 743 (e.g., 1 cm, 2 cm, 6 cm, etc.) and convergence (i.e., zero disparity) plane depth setting 744 (e.g., 1 m, 3 m, 5 m, etc.) determine how depth is captured in a synthetic image. More specifically, the convergence plane depth setting describes the depth of the zero disparity plane (i.e., the distance from the virtual cameras where points appear in the same position and thereby have no view disparity). Camera settings included in camera capture settings 540 for virtual cameras may be identical to camera settings included in actual camera devices. In one embodiment, the camera settings for two virtual cameras may be identical a dual camera system included in a smartphone (e.g., the RED Hydrogen one or iPhone XS). One example dual camera smartphone system imitated by camera settings for virtual cameras included in camera capture settings 540 incorporates dual side by side mounted 12.3 Mega Pixel (MP) cameras having a phase detection auto focus (PDAF) sensor and a fixed narrow baseline (e.g., 13 mm).

In other embodiments, camera capture settings 540 are configured to simulate other dual camera systems, for example, systems having two Sony FCB-ER8550 or FCB-CR8550/8530 complimentary metal-oxide-semiconductor (CMOS) sensor color camera modules mounted with lenses perpendicular to each other behind a beam splitter, wherein the perpendicular arrangement allows for a wide range of available baseline settings 743 (e.g., 0 mm to 35 mm). Synthetic stereo image pairs generated using camera settings files including parameters for camera intrinsics, camera calibration metadata, and camera capture settings identical to parameters of actual stereo camera devices allow the first and second virtual cameras capturing the synthetic stereo image pair to simulate the capture performance of right and left stereo modules included in an actual stereo camera device. Camera capture settings 540 may also be configured to simulate single camera systems. In one embodiment, the performance of single and multi camera devices is simulated by setting values for a zoom setting 741, focus setting 742, baseline setting 743, and/or convergence plane depth setting 744 to a value within the range of possible values for each capture setting on an actual camera device. To simulate a dual camera system included in the RED Hydrogen One smart phone, a zoom setting 741 is set to 1.5×, focus setting 742 to 0.01 mm, baseline setting 743 to 13 mm, and convergence plane depth setting to 2.7 m. The synthetic image generation system 101 then generates a synthetic phone using the camera file 500 having the above camera settings included in the camera capture settings 540. In one embodiment, to simulate the performance of an actual device at a variety of camera settings, the values for each dynamic capture setting included in the Hydrogen One dual camera (e.g., zoom 741, focus 742, and convergence plane depth 744) are incrementally varied with one synthetic image generated for each set of unique camera settings.

Camera capture settings 540 may also include one or more parameters describing scene conditions used during synthetic image capture. In one embodiment, one or more lighting setting 745 may describe the lighting conditions of a particular scene. Lighting settings 745 may define the number of light sources present in a scene, the position of each light source, and the intensity of light emitted from each light source. One or more lighting settings may correspond to light based effects or degradations provided in the augmentation settings 550. In one embodiment, one or more light settings 745 may influence the value of one or more augmentation settings 550. In one embodiment, the presence and position of a lens flare effect 752 depends on the location and intensity of one or more light sources. For example, a light source emitting and intense light located in the left corner of the horizon captured in the background of a synthetic image generates a lens flare effect 752 coming from the left side of the image. The lens flare effect may also reflect off of flat surfaces located in the upper portion of the foreground and right side of the image creating glare distortion in other areas of the synthetic image.

Augmentation settings 550 describe image effects and degradations that may be included in synthetic images generated by the synthetic image generation module 101. In some embodiments, augmentation settings 550 make synthetic images more realistic under certain capture conditions. In other examples, augmentation settings 550 make camera simulations more accurate by simulating image degradations that occur during capture by actual camera devices as a result of unfavorable capture conditions, poor camera calibration, and other performance errors. In one embodiment, augmentation settings 550 describing image degradations caused by capture conditions include camera blur effects 750 and lens flare effects 752. Augmentation settings 550 describing image degradations that may be caused by poor camera calibration and/or performance include lens distortion effects 751, polar coordinate distortion effects 753, and image noise effects 754.

In one embodiment, camera blur 750 and lens flare 752 effects may be included in augmentation settings 550 for virtual cameras generating synthetic images under specific capture conditions. One camera blur effect 750 includes motion blur (i.e., a streaking effect of some captured objects) resulting from long exposure and/or rapid movement of objects in a scene portion captured in a synthetic image. In other embodiments, a Camera blur effect 750 may be a Gaussian blur simulating capture with poor focus and/or a post capture smoothing and/or noise reducing function included in an actual camera device. Lens flare effects 752 are light scattering degradations within a lens system resulting from capturing bright light. In one embodiment, a lens flare effect 752 appears in a synthetic image if one or more high intensity light sources or objects reflecting bright light are included in a captured portion of a scene. If more than one high intensity light source is included in a captured portion of a scene, more than one lens flare effect 752 is included in a synthetic image.

Augmentation settings 550 describing image degradations caused by poor camera calibration and/or performance include lens distortion effects 751, polar coordinate distortion effects 753, and image noise effects 754. Lens distortion effects 751 may occur due to inaccurate calibration of camera intrinsic parameters 520. Specifically, an incorrect distortion model including one or more erroneous distortion coefficients 526 may stretch or compress a synthetic images generated by the virtual camera application. In one embodiment, a virtual camera having a camera settings file with an ultra wide angle lens (e.g., 180°) and a standard angle lens (e.g., 62°) distortion model generates synthetic images having a noticeable lens distortion effect 751 (i.e., a stretching of image pixels especially at the edges of the image). Polar coordinate distortion effects 753 are produced by inaccurate capture of projection coordinates at a camera view. In one embodiment, a virtual camera may generate a polar coordinate distortion 753 by capturing pixel coordinates in a Cartesian coordinate system as polar coordinates (i.e., a radial coordinate and an angular coordinate) in a polar coordinate system.

Image noise effects 754 may be generated by poor capture performance in a virtual camera. In one embodiment, image augmentation settings 550 are set up to produce a Gaussian noise effect in captured images. Gaussian noise refers to an equal distribution of noise throughout a synthetic image and may simulate a dirty lens or image sensor of an actual camera device. Other image noise effects 754 provided in the image augmentation settings include fixed pattern and banding. A fixed pattern noise effect distributes noise evenly in a uniform pattern across the entire synthetic image and may simulate a systematic error in performance of the image sensor of a virtual camera module or patterned obfuscation of a camera lens. A banding image noise effect distributes noise in a vertical or horizontal band pattern across the synthetic image and may simulate a specific light capture malfunction in a portion of the image sensor and/or a faulty camera display.

Synthetic Image Data Generation Methods

Figure 8:
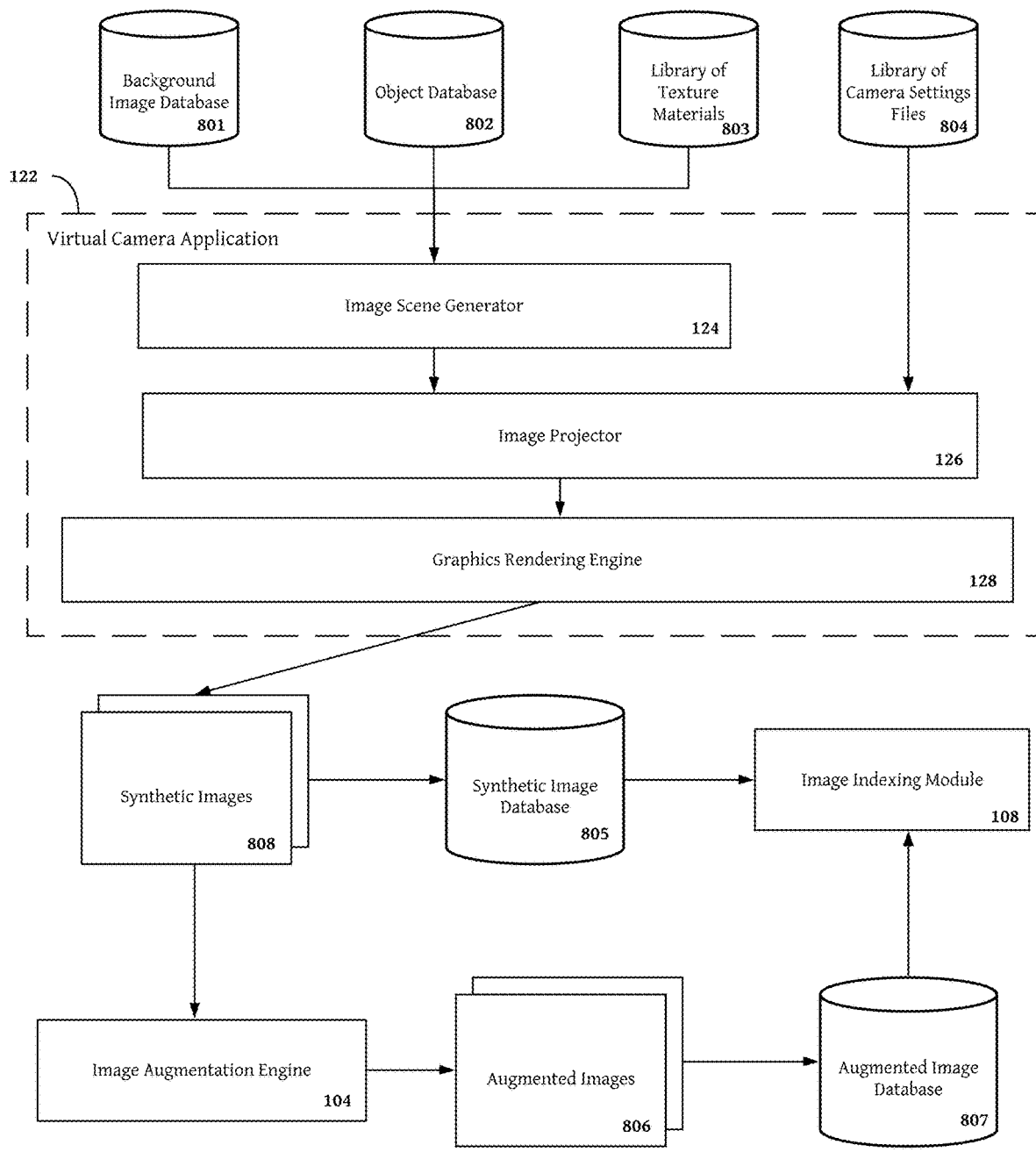
FIG. 8 is a flow chart illustrating an example process for generating synthetic images and augmented synthetic images.
Figure 9:
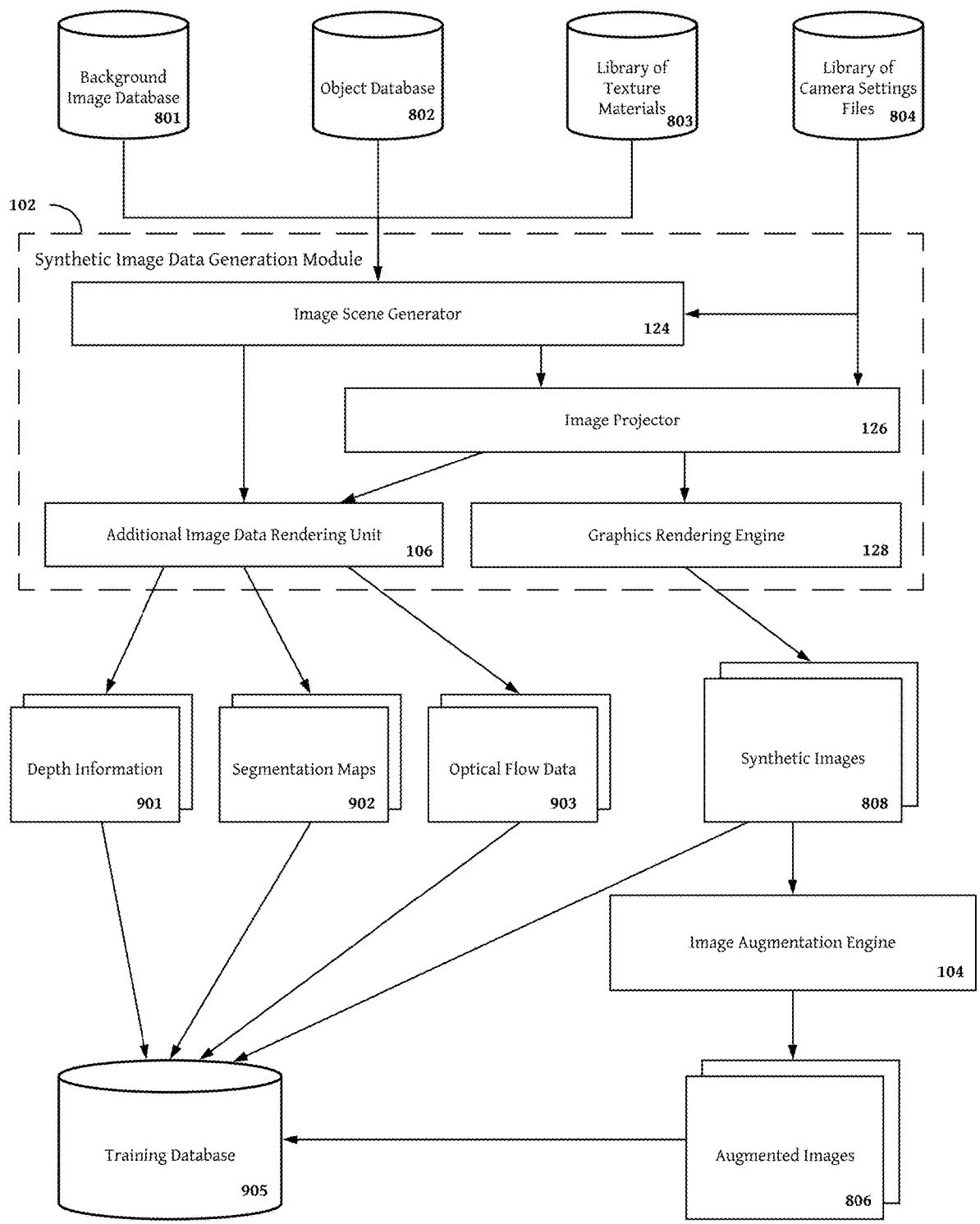
FIG. 9 is a flow chart illustrating an example process for assembling a training database including synthetic stereo images and additional image data channels.
Figure 11:
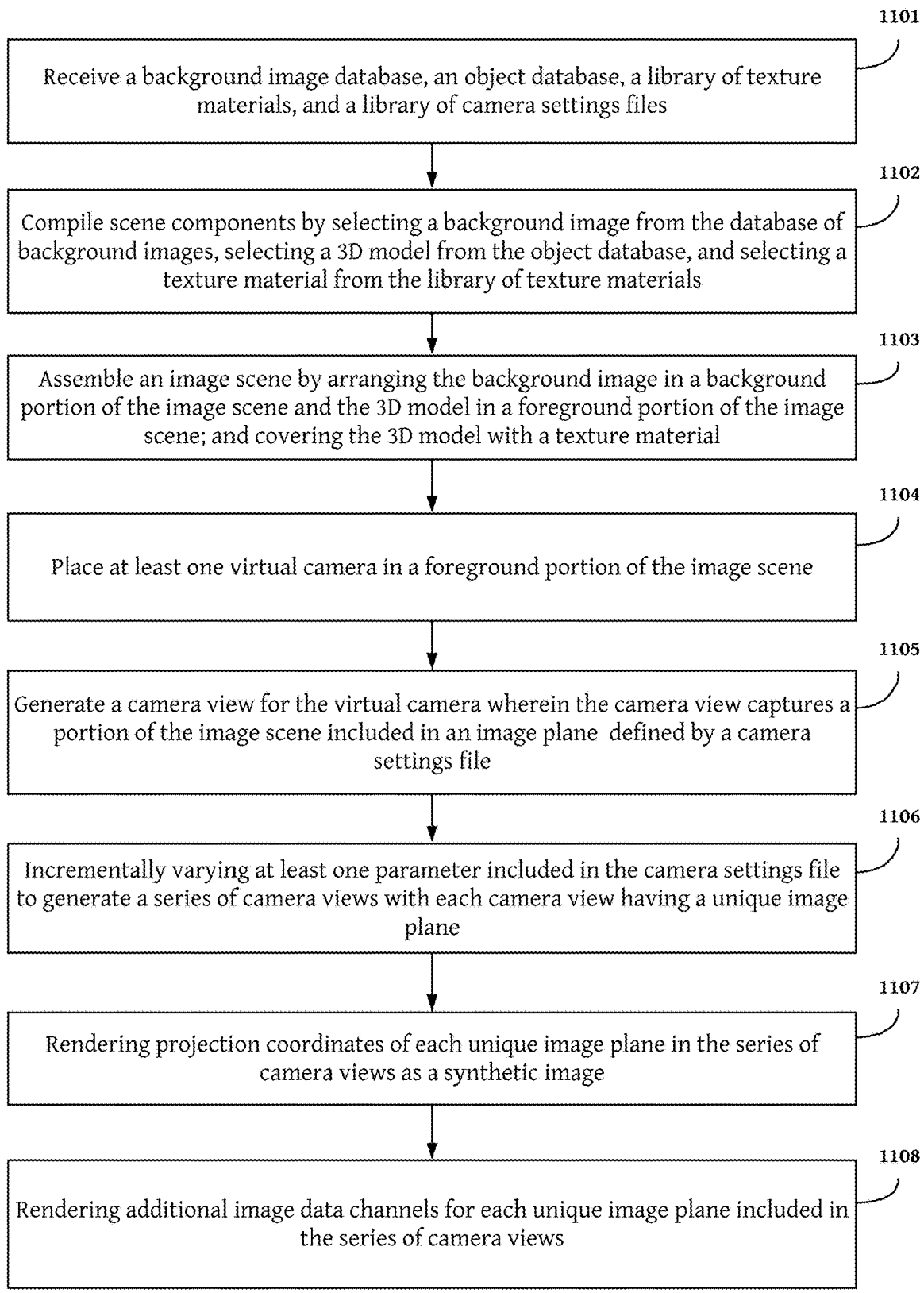
FIG. 11 is a block diagram representation of an example method for generating synthetic image data capturing a camera view of a synthetic image scene.

FIGS. 8-9 and 11 described below illustrate example image data generation methods using the synthetic image data system. FIG. 8 illustrates an example process for generating synthetic image data and augmented images, wherein the image data and augmented images are indexed by a index module. FIG. 9 illustrates an example process for assembling a training database including depth information, segmentation maps, scene flow maps, synthetic stereo images, and augmented images. A block diagram representation of a method for generating synthetic image data capturing a camera view of a synthetic image scene is shown in FIG. 11.

As shown in FIG. 8, a virtual camera application 122 may generate one or more synthetic image(s) 808. The virtual camera application 122 may generate synthetic images by capturing camera views of an image scene using one or more virtual cameras. To generate image scenes, the image scene generator 124 receives background images from a background image database 801, objects including 3D models and light sources from an object database 802, and texture files from a library of texture materials 803. The image scene generator 124 may select scene components (e.g., background images, objects, and texture files) using a scene component selection algorithm. Selected scene components are then assembled into an image scene according to a scene construction algorithm implemented in the image scene generator 124.

In one embodiment, the synthetic image 808 generated by the virtual camera application 122 captures a camera view of an image scene. Camera views may be defined by camera settings files included in a library of camera settings files 804, wherein each parameter of position data, camera intrinsics, camera calibration metadata, and camera capture settings impacts the camera view so that unique camera views may be generated by changing one or more parameters of a camera setting file. In one embodiment, the camera view is a realistic representation of an image scene perspective captured by an actual camera device (e.g., a smartphone camera, VR camera, 3D camera, stereo camera, light field camera or other digital camera device). To project camera views, the image projector 126 receives a camera settings file form the library of camera settings files 804 and uses virtual camera position data included in the camera settings file to place a virtual camera in an image scene created by the image scene generator 124. Using camera intrinsics, camera calibration metadata, and camera capture settings included in the camera settings file, the image projector 126 generates an image frame at the virtual camera position to create the camera view.

The graphics rendering engine 128 then renders projection coordinates of the image frame at the camera view as pixel coordinates of a synthetic image. By constructing a camera view of a virtual using the same parameters actual camera devices use to construct camera views in the real world, the image projector simulates performance of an actual camera device. Therefore, synthetic images 808 rendered by the graphics rendering engine 128 have the appearance of a virtual scene captured by an actual camera device. Synthetic images rendered by the graphics rendering engine 128 may include single images, stereo images including right and left stereo image pairs, or image sets including synthetic images capturing multiple camera views of a scene using camera intrinsics, camera calibration metadata, and camera capture settings for an actual camera device. One embodiment generating image sets may include incrementally changing the position of one or more virtual cameras within an image scene and capturing a synthetic image at each unique position. Another embodiment generating image sets may include incrementally changing one or more parameters included in camera intrinsics, camera calibration metadata, and/or camera capture settings independent of— or in addition to—changing position data.

Synthetic images 808 rendered by the graphics rendering engine 128 are written to a synthetic image database 805 as compressed (e.g., .png) or uncompressed (e.g., .jpeg) image files. Synthetic images 808 may also be provided to an image augmentation engine 104 for additional processing. Alternatively, the image augmentation engine 104 may fetch one or more synthetic images 808 from the synthetic image database 805. In one embodiment, the image augmentation engine 104 processes one or more synthetic images 808 to generate augmented images 806. The image augmentation engine 104 may add one or more image degradations or other effects to synthetic images 808 to generate augmented images 806. In one embodiment, augmented images 806 are written to an augmented image database 807 as compressed (e.g., .png) or uncompressed (e.g., .jpeg) image files. For efficient retrieval, synthetic image files included in the synthetic image 805 and augmented image files included in the augmented image database 807 may be indexed by an image indexing module 108. In one embodiment, the image indexing module 108 includes a search platform implementation of full text search on file names and other synthetic image and augmented image metadata.

FIG. 9 illustrates an example process for assembling a training database 905 comprising synthetic image data (e.g., synthetic images 808, augmented images 806, depth information 901, segmentation maps 902, optical flow data 903, etc.). Functions performed by components of the virtual camera application (i.e., the image scene generator 124, image projector 126, and graphics rendering engine 128) are the same as described above in FIG. 8 and will not be repeated herewith. Image scenes generated by the image scene generator 124 are provided to the additional image data rendering unit (AIDRU) 106. In some embodiments, camera views created by the image projector 126 are also provided to the AIDRU 106. To render additional image data including depth information 901, segmentation maps 902, and optical flow data 903, the AIDRU 106 may extract raw depth information and optical flow data from image scenes at a particular camera view. In one embodiment, image scenes must include one or more animations or other object movements to allow the AIDRU 106 to generate optical flow information (e.g., object velocity and direction).

Additional image data files generated by the AIDRU 106 are written to a training database 905 as compressed or uncompressed image data files. Additional image data files may also be saved in a library of additional image data. Synthetic images 808 generated by the graphics rendering engine 128 and augmented images created by the image augmentation engine 806 may also be written to a training database to assemble a training dataset that includes a complete synthetic image data profile for a camera view created for a specific actual camera device. In one example, a complete synthetic image data profile for a camera view created for an actual camera device includes a synthetic image 808, augmented images 806 having every image degradation or effect generated by the image augmentation engine 104, depth information 901, segmentation maps 902, optical flow data 903, and every other additional synthetic image data channel provided by the AIDRU 106.

The complete synthetic image data profile for the camera view may be written to the training database 905 as a training dataset. Other training dataset embodiments included in the training database 905 may have complete and/or partial synthetic image data profiles for multiple camera views of an actual camera device. Training datasets including multiple camera views may be used to simulate and/or tune performance of an actual camera device under various capture conditions. Training datasets including multiple camera views may also be used to generate additional image data (e.g., stereo image complements, depth information, segmentation maps, optical flow data, facial recognition models, feature maps, noise data, and occlusion maps). In other embodiments, training datasets include complete and/or partial synthetic image data profiles for the same camera view captured using camera settings file parameters of multiple actual camera devices. Training datasets including the same capture view may be used to simulate capture performance and/or generate additional image data for multiple camera devices. Training datasets including multiple capture views for multiple actual camera devices may be used to simulate capture performance and/or generate additional image data for multiple actual camera devices under variable capture conditions.

FIG. 11 is a block diagram representation of one example method of generating synthetic image data capturing a camera view of a synthetic image scene. In step 1101, the virtual camera application receives a background image database, an object database, a library of texture materials, and a library of camera settings files from a storage device. As shown in step 1102, the image scene generator may then select scene components (e.g., a background image, 3D model, and texture material) from the databases and libraries contained in the storage device. In some embodiments, the image scene generator may select one or more scene components using a scene component selection algorithm. The scene component selection algorithm may be a random selection algorithm selecting scene components at random from a database including a complete or partial collection of scene components. A partial collection of scene components may include a training dataset iteration or a verification dataset iteration described above. In other embodiments, the scene component selection algorithm may select scene components for assembling scenes having a particular image scene class (e.g., cityscape scene, landscape scene, selfie scene, portrait, wildlife scene, event scene, still life scene, night scene, aerial scene, underwater scene, action scene (i.e., scenes including animations moving one or more objects), street view scenes, driver point of view scenes, noisy scenes, distorted or degraded scenes, standard field of view scenes, wide filed of view scenes, and ultra wide field of view scenes). In one illustrative example, a scene component selection algorithm selecting scene components for generating landscape image scenes in the landscape image scene class select background images, objects, and texture materials associated with the landscape image scene class.

In step 1103, image scenes are assembled from selected scene components according to a scene assembly algorithm or other assembly instructions included in a scene metadata file. The image scene generator may assemble image scenes by arranging a background image in a background portion of an image scene, arranging a 3D model in a foreground portion of the image scene, and covering the 3D model with a texture material. In one embodiment, the image scene generator assembles image scenes using a scene assembly algorithm. One scene assembly algorithm implementation is a random scene assembly algorithm arranging scene components randomly across the area of an image scene. The random scene assembly algorithm may be tuned to arrange scene components to create a Gaussian distribution of other statistical distribution of scene components within an image scene. In other embodiments, the scene assembly algorithm may distribute scene components in a consistent and defined manner to assemble scenes having a particular image scene class (e.g., cityscape scene, landscape scene, selfie scene, portrait, wildlife scene, event scene, still life scene, night scene, aerial scene, underwater scene, action scene (i.e., scenes including animations moving one or more objects), street view scenes, driver point of view scenes, noisy scenes, distorted or degraded scenes, standard field of view scenes, wide filed of view scenes, and ultra wide field of view scenes). In this embodiment, a common scene class is defined for the scene selection algorithm and the scene assembly algorithm.

Steps 1104-1107 describe one example embodiment for generating synthetic images from assembled image scenes. At step 1104 a virtual camera is placed in a foreground portion of the image scene. In one example, the image projector places the virtual camera according to position information included in a camera settings file. The camera settings file used to position the virtual camera may be selected from a library of camera settings files and/or generated on the fly during the synthetic image generation process. In embodiments generating a stereo pair of synthetic images two or more virtual cameras are placed in the virtual image scene, wherein the two virtual cameras are positioned in a stereoscopic arrangement with camera calibration metadata included in the camera settings files for each virtual camera having stereoscopic calibration metadata describing a relative position between the first and second virtual cameras to ensure the image plane captured by the first virtual camera is the same as the second image plane captured by the second virtual camera.

At step 1105, camera views are generated for each virtual camera placed in the image scene by the image projector. The camera view may be a realistic representative of an image scene perspective captured by a virtual camera device, wherein the realistic representation is created using a camera settings file having parameters identical to the actual camera device. In one embodiment, parameters included in a camera settings file comprise camera intrinsics, camera calibration metadata, and camera capture settings. Optionally, at step 1106 different camera views may be created for an image scene to capture a variety of image scene perspectives. In one embodiment, one or more parameters included in a camera settings file are incrementally varied to generate a series of camera views with each camera view having a unique image plane. In embodiments having two or more virtual cameras placed in a stereoscopic arrangement, a series of right and left stereo camera views is generated for each virtual stereo camera, wherein each set of right and left stereo camera views has a unique image plane. To generate a robust training dataset, two or more synthetic image scenes are captured at the At step 1107 camera views are rendered as synthetic images. In one embodiment, projection coordinates included in an image plane corresponding to a camera view are rendered as a synthetic image. In examples having a series of camera views, each unique image plane included in the series of camera views is rendered as a synthetic image. To generate a pair of stereo synthetic images, right and left stereo images are generated at camera views captured by a first and second virtual camera, wherein the camera views have a common image plane defined by the camera settings file for the first and second virtual camera. Optionally, at step 1108, additional image data channels (e.g., stereo image complements, depth information, segmentation maps, optical flow data, facial recognition models, feature maps, noise data, and occlusion maps) may be rendered by the additional image data rendering unit for each camera view captured in a synthetic image and/or synthetic stereo image pair.

We claim:

1. A method for generating a synthetic image data by capturing a camera view of a synthetic image scene, the method comprising:
   receiving, by a processor, a database of background images, an object database including 3D models, a library of texture materials, and a library of camera setting files; constructing a synthetic image scene rendered by a graphics rendering engine, the constructing comprising: selecting a background image from the database of background images and arranging the background image in a background portion of the synthetic image scene;
   selecting a 3D model from the object database and arranging the 3D model in a foreground portion of the synthetic image scene; and covering the 3D model with a texture material selected from the library of texture materials;
   placing a virtual camera in the foreground portion of the synthetic image scene, the virtual camera capturing the camera view of the synthetic image scene contained in an image plane defined by a camera settings file having camera position data, camera intrinsics, camera calibration settings, and camera capture settings;
   rendering projection coordinates included in the image plane as pixel coordinates of a synthetic image; and
   appending the synthetic image to a training dataset comprising synthetic images having a common image scene class, wherein the training dataset is used for training a machine learning system to perform a computer vision task.

2. The method of claim 1, wherein the camera view is a realistic representation of an image scene perspective captured by a smartphone camera, the realistic representation created by using a camera settings file having parameters identical to the smartphone camera.

3. The method of claim 1, wherein camera position data comprises:
   3D Cartesian camera coordinates describing a virtual camera position in the synthetic image scene;
   image coordinates describing an image plane location including the camera view of the synthetic image scene; and
   rotation parameters including Euler angles describing rotational offset between a geometric coordinate system of the synthetic image scene and the image plane of the virtual camera.

4. The method of claim 1, wherein the background image is a 3D background image generated by combining an image file with a depth map comprising depth information for every point included in the image file.

5. The method of claim 1, wherein the computer vision task is selected from the group comprising, depth data generation, image segmentation, feature tracking, object tracking, facial recognition, image classification, object classification.

6. The method of claim 1, further comprising augmenting the synthetic image by modifying pixel coordinates with one or more image effects to generate augmented images; and
   appending augmented images to the training dataset.

7. The method of claim 6, wherein the image effect modifying pixel coordinates of the synthetic image is selected from the group comprising camera blur, lens distortion, lens flare, polar coordinate distortion, and image noise.

8. The method of claim 6, further comprising indexing synthetic images included in the training database on a metadata field, the metadata field selected from a group comprising image scene class, scene metadata, image metadata, additional image data associated with a synthetic image, augmented images associated with a synthetic image, parameters in a camera settings file, and smartphone model camera simulated in a synthetic image.

9. The method of claim 1, further comprising rendering depth data for the synthetic image by associating pixel coordinates of the synthetic image with ground truth depth information describing a distance between a point included in a synthetic image pixel and the virtual camera capturing the synthetic image.

10. The method of claim 9, wherein the ground truth depth information is generated during synthetic image generation by associating the background image and each point in the 3D model with a depth value.

11. The method of claim 9, further comprising rendering additional image data for the synthetic image scene, wherein additional image data includes image segmentation data, optical flow information, noise data, and occlusion maps.

12. The method of claim 1, wherein camera intrinsics, camera calibration metadata, and camera capture settings included in the first camera settings file are setup identical to an actual camera device allowing the virtual camera to simulate capture performance of the actual camera device.

13. A method for generating a pair of synthetic stereo images comprising:
   receiving, by a processor, a background image database, an object database, a library of texture materials, and a library of camera settings files;
   constructing, by a computer graphics engine, an image scene captured in the pair of synthetic stereo images, the constructing comprising: selecting a background image from the database of background images and arranging the background image in a background portion of the image scene;
   selecting a 3D model from the object database and arranging the 3D model in a foreground portion of the image scene; and
   covering the 3D model with a texture material selected from the library of texture materials;
   placing a first virtual camera in a foreground portion of the image scene, the first virtual camera capturing a camera view of the image scene within an image plane defined by a first camera setting file having camera position data, camera intrinsics, camera calibration metadata, and camera capture settings;
   placing a second virtual camera in a foreground portion of the image scene the second virtual camera capturing a camera view of the image scene within the image plane defined by a second camera setting file having camera position data, camera intrinsics, camera calibration metadata, and camera capture settings, wherein the first virtual camera and the second virtual camera are in a stereoscopic arrangement with camera calibration metadata included in the first camera setting file and the second camera setting file having stereoscopic calibration metadata describing a relative position between the first virtual camera and the second virtual camera to ensure the image plane captured by first virtual camera is the same as the image plane captured by the second virtual camera;
   rendering projection coordinates included in the image plane of the first virtual camera as pixel coordinates of a first synthetic image included in the pair of synthetic stereo images;
   rendering projection coordinates included in the image plane of the second virtual camera as pixel coordinates of a second synthetic image included in the pair of synthetic stereo images; and
   appending the pair of synthetic stereo images to a training dataset, and wherein the training dataset is used for training a machine learning system to perform a computer vision task.

14. The method of claim 13, wherein stereoscopic calibration metadata includes a rotation matrix, a translation vector, and a rectification matrices, the rotation matrix describing a rotational correction aligning images captured by the first virtual camera and the second virtual camera on the same image plane, the translation vector describing a projection operation vertically aligning the image frame of the first virtual camera with the image frame of the second virtual camera, the rectification matrix combines the rotational correction and the projection operation for efficient processing with each image pixel during rectification.

15. The method of claim 13, wherein camera intrinsics, camera calibration metadata, and camera capture settings included in the first camera settings file and the second camera settings file are setup identical to an actual stereo camera device allowing the first virtual camera and the second virtual camera to simulate capture performance of left and right stereo camera modules included in the actual stereo camera device.

16. The method of claim 15, wherein camera capture settings include baseline, zoom, focus, and convergence plane depth.

17. A method for generating synthetic image data comprising:
- receiving, by a processor, a database of background images, an object database including 3D models, a library of texture materials, a library of scene metadata, and a library of camera setting files;
- constructing, by a computer graphics engine, a first synthetic image scene having an image scene class specified in a first scene metadata file, the constructing comprising: selecting a background image from the database of background images, wherein the background image is associated with the image scene class and arranged in a background portion of the first synthetic image scene according to instructions included in the first scene metadata file;
- populating a foreground portion of the first synthetic image scene with 3D models associated with the image scene class and arranging the 3D models in a foreground portion of the synthetic image scene according to instructions included in the first scene metadata file;
- covering the 3D model with a texture material selected from the library of texture materials, wherein the texture material is associated with the image scene class;
- placing, by an image projector, a virtual camera within the synthetic image scene, the virtual camera capturing a camera view of the first synthetic image scene contained in an image plane defined by a camera settings file having camera position data, camera intrinsics, camera calibration settings, camera capture settings;
- incrementally varying at least one parameter included in the camera settings file to provide a first series of camera views, wherein each camera view has a unique image plane;
- for each camera view included in the first series of camera views, rendering projection coordinates included in the image plane of a camera view as a synthetic image; and
- rendering additional image data for the first synthetic image scene at each unique camera view included in the first series of camera views;
- constructing a second synthetic image scene having the image scene class selected for the first synthetic image scene, the second synthetic image scene constructed according to instructions included in a second scene metadata file;
- placing, by the image projector, the virtual camera in the second synthetic image scene, the virtual camera capturing a second series of camera views of the second synthetic image scene, wherein the second series of camera views has the same position and direction as the first series of camera views capturing the first synthetic image scene;
- for each camera view included in the second series of camera views, rendering projection coordinates included in an image plane for a camera view as a synthetic image;
- rendering additional image data for the second synthetic image scene at each unique camera view included in the second series of camera views; and
- assembling synthetic images and the additional image data for the first and second synthetic image scenes in a training dataset associated with the image scene class, wherein the training dataset is used to train a machine learning system to perform a computer vision task.

18. The method of claim 17, wherein the image scene class is selected from the group comprising landscape scene, cityscape scene, selfie scene, wildlife scene, event scene, action scene, street view scene, and driver point of view scene.

* * * * *